(12) United States Patent
Duffy et al.

(10) Patent No.: US 12,407,894 B2
(45) Date of Patent: Sep. 2, 2025

(54) DIGITAL ASSISTANT FOR PROVIDING GRAPHICAL OVERLAYS OF VIDEO EVENTS

(71) Applicant: Apple Inc., Cupertino, CA (US)

(72) Inventors: Gavin K. Duffy, Los Gatos, CA (US); Raymond M. Macharia, San Francisco, CA (US); Jessica J. Peck Brown, Morgan Hill, CA (US); Robert M. Schulman, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 18/587,689

(22) Filed: Feb. 26, 2024

(65) Prior Publication Data

US 2024/0205489 A1    Jun. 20, 2024

Related U.S. Application Data

(63) Continuation of application No. PCT/US2022/041912, filed on Aug. 29, 2022.
(Continued)

(51) Int. Cl.
*H04N 21/431* (2011.01)
*G06F 3/01* (2006.01)
(Continued)

(52) U.S. Cl.
CPC ......... *H04N 21/4312* (2013.01); *G06F 3/013* (2013.01); *G06F 3/017* (2013.01);
(Continued)

(58) Field of Classification Search
CPC ..... H04N 21/4312; G06F 3/013; G06F 3/017; G06F 3/1431; G06F 3/167;
(Continued)

(56) References Cited

U.S. PATENT DOCUMENTS

| | | |
|---|---|---|
| 8,056,099 B2 | 11/2011 | Shanks et al. |
| 8,358,907 B2 | 1/2013 | Inagaki et al. |

(Continued)

FOREIGN PATENT DOCUMENTS

| | | |
|---|---|---|
| CN | 102857808 A | 1/2013 |
| CN | 104584010 A | 4/2015 |

(Continued)

OTHER PUBLICATIONS

International Preliminary Report on Patentability received for PCT Patent Application No. PCT/US2022/041927, mailed on Mar. 14, 2024, 11 pages.

(Continued)

*Primary Examiner* — Kyu Chae
(74) *Attorney, Agent, or Firm* — DLA Piper LLP (US)

(57) ABSTRACT

An example process includes while displaying, on a display, a video event: receiving, by a digital assistant, a natural language speech input corresponding to a participant of the video event; in accordance with receiving the natural language speech input, identifying, by the digital assistant, based on context information associated with the video event, a first location of the participant; and in accordance with identifying the first location of the participant, augmenting, by the digital assistant, the display of the video event with a graphical overlay displayed at a first display location corresponding to the first location of the participant.

43 Claims, 8 Drawing Sheets

Related U.S. Application Data

(60) Provisional application No. 63/239,290, filed on Aug. 31, 2021.

(51) Int. Cl.
  *G06F 3/14* (2006.01)
  *G06F 3/16* (2006.01)
  *G10L 15/18* (2013.01)

(52) U.S. Cl.
  CPC ............ *G06F 3/1431* (2013.01); *G06F 3/167* (2013.01); *G10L 15/1822* (2013.01)

(58) Field of Classification Search
  CPC .... G10L 15/1822; G06V 20/20; G06V 20/42; G06V 20/63; G06V 40/18
  See application file for complete search history.

(56) References Cited

U.S. PATENT DOCUMENTS

| | | | |
|---|---|---|---|
| 8,606,090 | B2 | 12/2013 | Eyer |
| 9,250,703 | B2 | 2/2016 | Hernandez-Abrego et al. |
| 9,298,986 | B2 | 3/2016 | Ferlatte et al. |
| 9,338,493 | B2 | 5/2016 | Van Os et al. |
| 9,858,925 | B2 | 1/2018 | Gruber et al. |
| 10,317,992 | B2 | 6/2019 | Prokofieva et al. |
| 10,331,312 | B2 | 6/2019 | Napolitano et al. |
| 10,475,446 | B2 | 11/2019 | Gruber et al. |
| 10,659,851 | B2 | 5/2020 | Lister et al. |
| 10,726,631 | B1 | 7/2020 | Ha |
| 10,732,708 | B1 | 8/2020 | Roche et al. |
| 10,832,031 | B2 | 11/2020 | Kienzle et al. |
| 11,507,183 | B2 | 11/2022 | Manjunath et al. |
| 11,755,275 | B2 | 9/2023 | Lovitt |
| 12,045,288 | B1 * | 7/2024 | Barut .................... G06F 16/532 |
| 2002/0166123 | A1 | 11/2002 | Schrader et al. |
| 2010/0318357 | A1 | 12/2010 | Istvan et al. |
| 2011/0289530 | A1 | 11/2011 | Dureau et al. |
| 2012/0162540 | A1 | 6/2012 | Ouchi et al. |
| 2012/0265528 | A1 | 10/2012 | Gruber et al. |
| 2013/0339991 | A1 | 12/2013 | Ricci |
| 2014/0053198 | A1 | 2/2014 | Sirpal et al. |
| 2014/0081633 | A1 | 3/2014 | Badaskar |
| 2014/0181865 | A1 | 6/2014 | Koganei |
| 2014/0237366 | A1 | 8/2014 | Poulos et al. |
| 2015/0382047 | A1 | 12/2015 | Van Os et al. |
| 2016/0212488 | A1 | 7/2016 | Van Os et al. |
| 2016/0378861 | A1 * | 12/2016 | Eledath .................. G06V 20/52 707/766 |
| 2017/0068423 | A1 | 3/2017 | Napolitano et al. |
| 2017/0068670 | A1 | 3/2017 | Orr et al. |
| 2017/0230709 | A1 | 8/2017 | Van Os et al. |
| 2017/0235361 | A1 | 8/2017 | Rigazio et al. |
| 2017/0285915 | A1 | 10/2017 | Napolitano et al. |
| 2019/0259386 | A1 | 8/2019 | Kudurshian et al. |
| 2019/0310765 | A1 | 10/2019 | Napolitano et al. |
| 2019/0362557 | A1 | 11/2019 | Lacey et al. |
| 2019/0371327 | A1 * | 12/2019 | Quinn .................... G10L 15/16 |
| 2019/0391726 | A1 | 12/2019 | Iskandar et al. |
| 2020/0105260 | A1 | 4/2020 | Piernot et al. |
| 2020/0218074 | A1 | 7/2020 | Hoover et al. |
| 2020/0226823 | A1 | 7/2020 | Stachniak et al. |
| 2021/0105528 | A1 | 4/2021 | Van Os et al. |
| 2021/0191603 | A1 | 6/2021 | Napolitano et al. |
| 2021/0191968 | A1 | 6/2021 | Orr et al. |
| 2023/0066552 | A1 | 3/2023 | Van Os et al. |
| 2024/0192917 | A1 | 6/2024 | Duffy et al. |

FOREIGN PATENT DOCUMENTS

| | | |
|---|---|---|
| CN | 106462617 A | 2/2017 |
| JP | 2014-126600 A | 7/2014 |
| JP | 2015-527683 A | 9/2015 |
| KR | 10-2015-0038375 A | 4/2015 |
| KR | 10-2017-0036805 A | 4/2017 |
| WO | 2014/047047 A1 | 3/2014 |
| WO | 2016/049439 A1 | 3/2016 |
| WO | 2017/044257 A1 | 3/2017 |

OTHER PUBLICATIONS

International Search Report and Written Opinion received for PCT Patent Application No. PCT/US2022/041927, mailed on Dec. 22, 2022, 16 pages.
"Second Spectrum", Available online at: https://www.secondspectrum.com/video.html, Retrieved on Nov. 4, 2024, 5 pages.
Lu et al., "Learning to Track and Identify Players from Broadcast Sports Videos", Available online at: https://www.cs.ubc.ca/~murphyk/Papers/weilwun-pami12.pdf, Retrieved on Nov. 4, 2024, pp. 1-13.
102857808, CN, A, Cited by the Chinese Patent Office in an Office Action for related Patent Application No. 202110024848.8 on Feb. 29, 2024.
International Preliminary Report on Patentability received for PCT Patent Application No. PCT/US2022/041912, mailed on Mar. 14, 2024, 7 pages.
International Search Report and Written Opinion received for PCT Patent Application No. PCT/US2022/041912, mailed on Dec. 22, 2022, 10 pages.

* cited by examiner

DIGITAL ASSISTANT FOR PROVIDING GRAPHICAL OVERLAYS OF VIDEO EVENTS

CROSS-REFERENCE TO RELATED APPLICATIONS

This application is a continuation of PCT Application No. PCT/US2022/041912, entitled "DIGITAL ASSISTANT FOR PROVIDING GRAPHICAL OVERLAYS OF VIDEO EVENTS," filed on Aug. 29, 2022, which claims priority to U.S. Patent Application No. 63/239,290, entitled "DIGITAL ASSISTANT FOR PROVIDING GRAPHICAL OVERLAYS OF VIDEO EVENTS," filed on Aug. 31, 2021. The entire contents of each of these applications are hereby incorporated by reference in their entireties.

FIELD

This relates to using digital assistants to augment the display of video events with graphical overlays.

BACKGROUND

Digital assistants allow users to interact with electronic devices via natural language input. For example, after a user provides a spoken request to a digital assistant implemented on an electronic device, the digital assistant can determine a user intent corresponding to the spoken request. The digital assistant can then cause the electronic device to perform one or more task(s) to satisfy the user intent and to provide output(s) indicative of the performed task(s).

SUMMARY

Example methods are disclosed herein. An example method includes at an electronic device having one or more processors, memory, and a display: while displaying, on the display, a video event: receiving, by a digital assistant operating on the electronic device, a natural language speech input corresponding to a participant of the video event; in accordance with receiving the natural language speech input, identifying, by the digital assistant, based on context information associated with the video event, a first location of the participant; and in accordance with identifying the first location of the participant, augmenting, by the digital assistant, the display of the video event with a graphical overlay displayed at a first display location corresponding to the first location of the participant.

Example non-transitory computer-readable media are disclosed herein. An example non-transitory computer-readable storage medium stores one or more programs. The one or more programs comprise instructions, which when executed by one or more processors of an electronic device having a display, cause the electronic device to: while displaying, on the display, a video event: receive, by a digital assistant operating on the electronic device, a natural language speech input corresponding to a participant of the video event; in accordance with receiving the natural language speech input, identify, by the digital assistant, based on context information associated with the video event, a first location of the participant; and in accordance with identifying the first location of the participant, augment, by the digital assistant, the display of the video event with a graphical overlay displayed at a first display location corresponding to the first location of the participant.

Example electronic devices are disclosed herein. An example electronic device comprises a display; one or more processors; a memory; and one or more programs, where the one or more programs are stored in the memory and configured to be executed by the one or more processors, the one or more programs including instructions for: while displaying, on the display, a video event: receiving, by a digital assistant operating on the electronic device, a natural language speech input corresponding to a participant of the video event; in accordance with receiving the natural language speech input, identifying, by the digital assistant, based on context information associated with the video event, a first location of the participant; and in accordance with identifying the first location of the participant, augmenting, by the digital assistant, the display of the video event with a graphical overlay displayed at a first display location corresponding to the first location of the participant.

Augmenting the displays of video events with graphical overlays according to the techniques discussed herein allows digital assistants to efficiently and intelligently provide relevant graphical responses to user requests about the video event. For example, responsive to a natural language request received during display of a live sports game, the digital assistant can augment the display of the live sports game with one or more graphical overlays including information relevant to the user request. Automatically augmenting the display of video events without requiring further user input (e.g., after receiving the natural language input) makes the user-device interface more efficient (e.g., by reducing user inputs otherwise required to satisfy user requests about the video event, by helping users to understand information in the context of the displayed video event), which additionally, reduces power usage and improves device battery life by enabling quicker and more efficient device usage.

DESCRIPTION

Examples of systems and techniques for implementing extended reality (XR) based technologies are described herein.

Figure 1A:
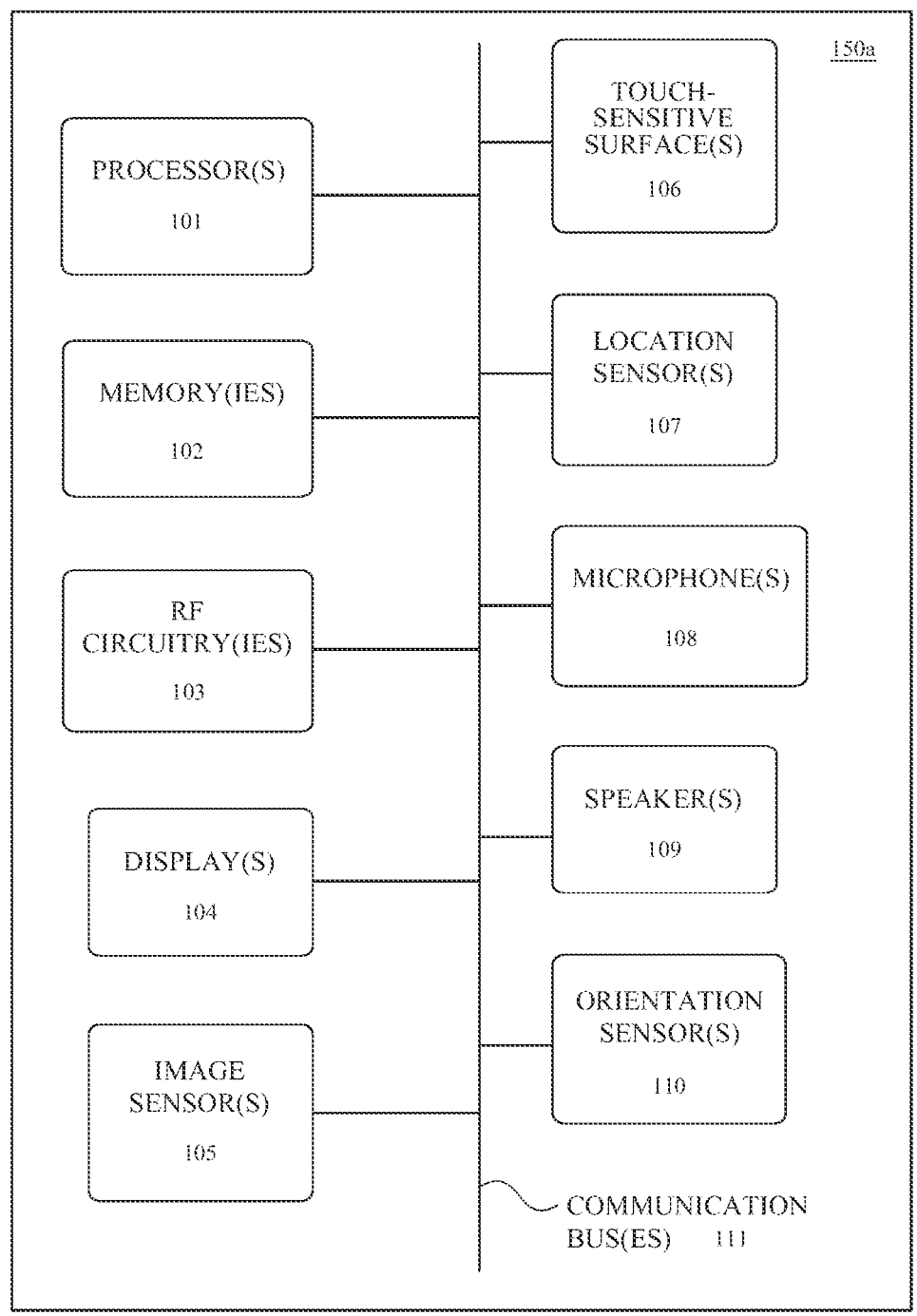
FIGS. 1A-1B depict exemplary systems for use in various extended reality technologies.
Figure 1B:
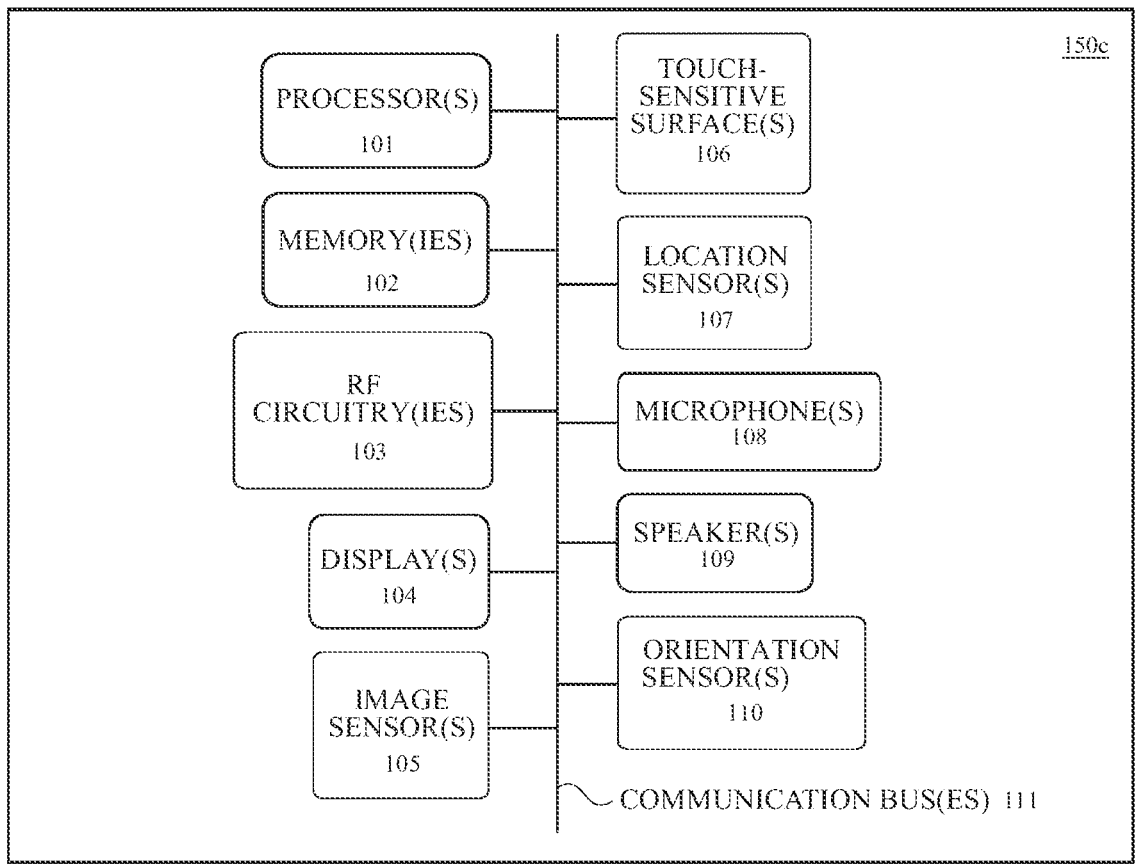
Figure 1B:
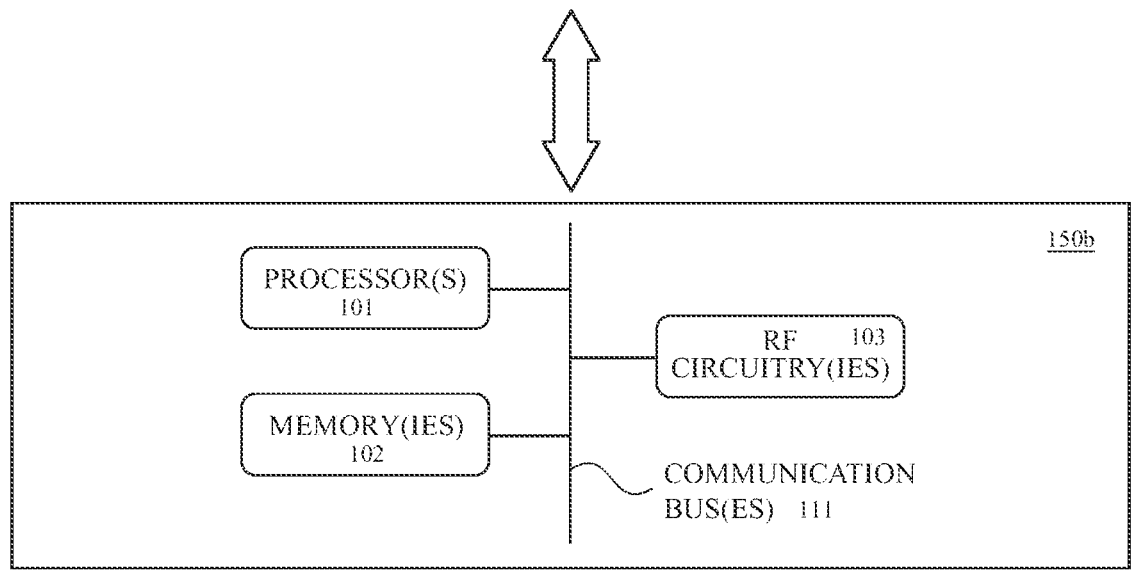

FIG. 1A and FIG. 1B depict exemplary system 150 used to implement various extended reality technologies.

In the example of FIG. 1A, system 150 includes device 150*a*. Device 150*a* includes at least some of: processor(s) 101, memory(ies) 102, RF circuitry(ies) 103, display(s) 104, image sensor(s) 105, touch-sensitive surface(s) 106, location sensor(s) 107, microphone(s) 108, speaker(s) 109, and orientation sensor(s) 110. Communication bus(es) 111 of device 150*a* optionally enable communication between the various components of device 150*a*.

In some examples, some components of system 150 are implemented in a base station device (e.g., a computing device such as a laptop, remote server, or mobile device) and other components of system 150 are implemented in a second device (e.g., a head-mounted device). In some examples, the base station device or the second device implements device 150a.

In the example of FIG. 1B, system 150 includes at least two devices in communication, e.g., via a wired connection or a wireless connection. First device 150c (e.g., a head-mounted device) includes at least some of: processor(s) 101, memory(ies) 102, RF circuitry(ies) 103, display(s) 104, image sensor(s) 105, touch-sensitive surface(s) 106, location sensor(s) 107, microphone(s) 108, speaker(s) 109, and orientation sensor(s) 110. Communication bus(es) 111 of first device 150c optionally enable communication between the components of first device 150c. Second device 150b, such as a base station device, includes processor(s) 101, memory(ies) 102, and RF circuitry(ies) 103. Communication bus(es) 111 of second device 150b optionally enable communication between the components of second device 150b.

Processor(s) 101 include, for instance, graphics processor(s), general processor(s), and/or digital signal processor(s).

Memory(ies) 102 are one or more non-transitory computer-readable storage mediums (e.g., flash memory, random access memory) storing computer-readable instructions. The computer-readable instructions, when executed by processor(s) 101, cause system 150 to perform various techniques discussed below.

RF circuitry(ies) 103 include, for instance, circuitry to enable communication with other electronic devices and/or with networks (e.g., intranets, the Internet, wireless networks (e.g., local area networks and cellular networks)). In some examples, RF circuitry(ies) 103 include circuitry enabling short-range and/or near-field communication.

In some examples, display(s) 104 implement a transparent or semi-transparent display. Accordingly, a user can view a physical setting directly through the display and system 150 can superimpose virtual content over the physical setting to augment the user's field of view. In some examples, display(s) 104 implement an opaque display. In some examples, display(s) 104 transition between a transparent or semi-transparent state and an opaque state.

In some examples, display(s) 104 implement technologies such as liquid crystal on silicon, a digital light projector, LEDs, OLEDs, and/or a laser scanning light source. In some examples, display(s) 104 include substrates (e.g., light waveguides, optical reflectors and combiners, holographic substrates, or combinations thereof) through which light is transmitted. Alternative example implementations of display(s) 104 include display-capable automotive windshields, display-capable windows, display-capable lenses, heads up displays, smartphones, desktop computers, or laptop computers. As another example implementation, system 150 is configured to interface with an external display (e.g., smartphone display). In some examples, system 150 is a projection-based system. For example, system 150 projects images onto the eyes (e.g., retina) of a user or projects virtual elements onto a physical setting, e.g., by projecting a holograph onto a physical setting or by projecting imagery onto a physical surface.

In some examples, image sensor(s) 105 include depth sensor(s) for determining the distance between physical elements and system 150. In some examples, image sensor(s) 105 include visible light image sensor(s) (e.g., charged coupled device (CCD) sensors and/or complementary metal-oxide-semiconductor (CMOS) sensors) for obtaining imagery of physical elements from a physical setting. In some examples, image sensor(s) 105 include event camera(s) for capturing movement of physical elements in the physical setting. In some examples, system 150 uses depth sensor(s), visible light image sensor(s), and event camera(s) in conjunction to detect the physical setting around system 150. In some examples, image sensor(s) 105 also include infrared (IR) sensor(s) (e.g., passive or active IR sensors) to detect infrared light from the physical setting. An active IR sensor implements an IR emitter (e.g., an IR dot emitter) configured to emit infrared light into the physical setting.

In some examples, image sensor(s) 105 are used to receive user inputs, e.g., hand gesture inputs. In some examples, image sensor(s) 105 are used to determine the position and orientation of system 150 and/or display(s) 104 in the physical setting. For instance, image sensor(s) 105 are used to track the position and orientation of system 150 relative to stationary element(s) of the physical setting. In some examples, image sensor(s) 105 include two different image sensor(s). A first image sensor is configured to capture imagery of the physical setting from a first perspective and a second image sensor is configured to capture imagery of the physical setting from a second perspective different from the first perspective.

Touch-sensitive surface(s) 106 are configured to receive user inputs, e.g., tap and/or swipe inputs. In some examples, display(s) 104 and touch-sensitive surface(s) 106 are combined to form touch-sensitive display(s).

In some examples, microphone(s) 108 are used to detect sound emanating from the user and/or from the physical setting. In some examples, microphone(s) 108 include a microphone array (e.g., a plurality of microphones) operating in conjunction, e.g., for localizing the source of sound in the physical setting or for identifying ambient noise.

Orientation sensor(s) 110 are configured to detect orientation and/or movement of system 150 and/or display(s) 104. For example, system 150 uses orientation sensor(s) 110 to track the change in the position and/or orientation of system 150 and/or display(s) 104, e.g., relative to physical elements in the physical setting. In some examples, orientation sensor(s) 110 include gyroscope(s) and/or accelerometer(s).

Figure 2:
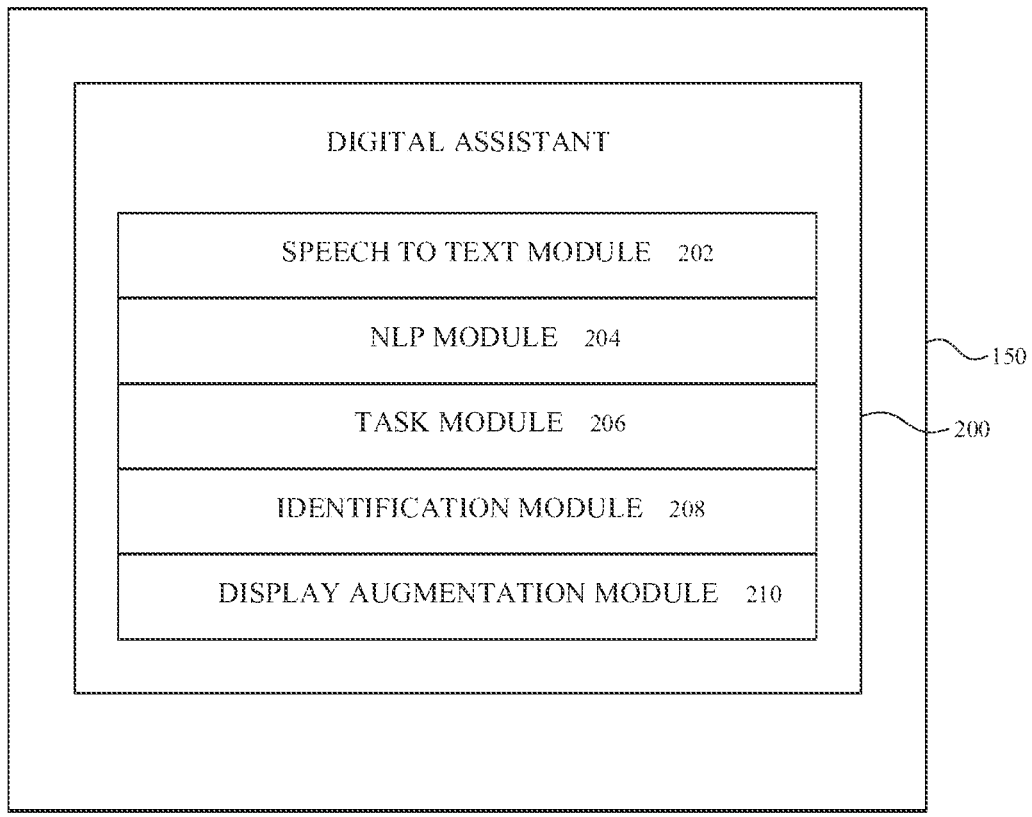
FIG. 2 illustrates a block diagram of a digital assistant, according to various examples.

FIG. 2 illustrates a block diagram of digital assistant (DA) 200, according to various examples.

The example of FIG. 2 shows that DA 200 is implemented, at least partially, within system 150, e.g., within device 150a, 150b, or 150c. For example, DA 200 is at least partially implemented as computer-executable instructions stored in memory(ies) 102. In some examples, DA 200 is implemented in a distributed manner, e.g., distributed across multiple computing systems. For example, the components and functions of DA 200 are divided into a client portion and a server portion. The client portion is implemented on one or more user devices (e.g., devices 150a, 150b, 150c) and may communicate with a computing server via one or more networks. The components and functions of DA 200 are implemented in hardware, software instructions for execution by one or more processors, firmware (e.g., one or more signal processing and/or application specific integrated circuits), or a combination or sub-combination thereof. It will be appreciated that DA 200 is exemplary, and thus DA 200 can have more or fewer components than shown, can combine two or more components, or can have a different configuration or arrangement of the components.

As described below, DA 200 performs at least some of: automatic speech recognition (e.g., using speech to text (STT) module 202); determining a user intent corresponding to received natural language input; determining a task flow to satisfy the determined intent; and executing the task flow to satisfy the determined intent.

In some examples, DA 200 includes natural language processing (NLP) module 204 configured to determine the user intent. NLP module 204 receives candidate text representation(s) generated by STT module 202 and maps each of the candidate text representations to a "user intent" recognized by the DA. A "user intent" corresponds to a DA performable task and has an associated task flow implemented in task module 206. The associated task flow includes a series of programmed actions (e.g., executable instructions) the DA takes to perform the task. The scope of DA 200's capabilities can thus depend on the types of task flows implemented in task module 206, e.g., depend on the types of user intents the DA recognizes.

In some examples, upon identifying a user intent based on the natural language input, NLP module 204 causes task module 206 to perform the actions for satisfying the user request. For example, task module 206 executes the task flow corresponding to the determined intent to perform a task satisfying the user request. In some examples, executing a task flow includes employing the services of identification module 208 and display augmentation module 210, discussed below, to perform the task. In some examples, performing the task includes causing system 150 to provide graphical, audio, and/or haptic output indicating the performed task.

In some examples, DA 200 includes identification module 208. Identification module 208 is configured to perform various identification actions based on instructions from task module 206, e.g., based on instructions generated by executing a task flow. For example, identification module 208 is configured to identify participants (e.g., players or persons) in video events, identify the participants' displayed locations, and track the participants' movements. Example video events include broadcasts/videos of sports games/competitions, videos of performances (e.g., concerts and shows), television broadcasts, movies, and the like.

In some examples, as discussed below with respect to FIGS. 3A-3H, identification module 208 implements computer vision techniques (e.g., image recognition, facial and/or body recognition, image tracking) to perform the identification actions. For example, identification module 208 is configured to identify a participant referred to by the natural language input "who is that?" and track the identified participant's movement in a video event. In some examples, identification module 208 implements probabilistic techniques (e.g., machine-learning techniques) to identify participants. For example, identification module 208 determines and/or adjusts likelihood scores of candidate participants and identifies the candidate participant having the highest likelihood score and/or having a likelihood score above a threshold. The likelihood scores of candidate participants are based on various context information, detailed below, associated with the video event (e.g., whether an audio stream of the video event names a candidate participant, the frequency with which the user gazes at a candidate participant, the degree of match between a candidate participant's identified visual features and known information about participants in the video event (e.g., jersey numbers, jersey design, facial and/or bodily features), a confidence associated with facial and/or body recognition of the candidate participant).

In some examples, as discussed below with respect to FIGS. 3A-3H, identification module 208 implements gaze tracking techniques (e.g., on user gaze data detected by image sensor(s) 105) to identify the locations of participants. For example, identification module 208 identifies a current (or previous) user gaze location and identifies a participant displayed at or near the current (or previous) user gaze location. In some examples, identification module 208 identifies the locations of participants based on user gesture inputs (e.g., tap gestures or pointing gestures detected by image sensor(s) 105, display(s) 104, and/or touch-sensitive surfaces(s) 106). For example, identification module 208 identifies a display location corresponding to user gesture input (e.g., where the user points at) and identifies a participant displayed at or near the display location.

In some examples, DA 200 includes display augmentation module 210. In conjunction with task module 206 and identification module 208, display augmentation module 210 is configured to cause system 150 (e.g., device 150*a* or 150*c*) to augment the display of video events. For example, display augmentation module 210 generates a graphical overlay and causes system 150 to augment the display of a video event with the graphical overlay. As one example, responsive to a user asking DA 200 "who is that?" during display of a live sports game, identification module 208 identifies the intended participant. Display augmentation module 210 then causes system 150 to augment the display of the live sports game with a graphical overlay identifying the participant, e.g., where the graphical overlay would not otherwise be displayed in the live sports game.

In some examples, display augmentation module 208 generates different types of graphical overlays and augments the display of video events in different manners based on instructions from task module 206. For example, by executing a particular task flow corresponding to a particular user intent, task module 206 causes display augmentation module 208 to generate a type of graphical overlay corresponding to the particular user intent. Various types of graphical overlays and the various manners in which DA 200 can augment the display of video events with the graphical overlays are now discussed with respect to FIGS. 3A-3H.

FIGS. 3A-3H illustrate various manners of augmenting the display of video events with graphical overlays, according to various examples. FIGS. 3A-3H show display 302 of device 300, e.g., a head mounted device. Device 300 is implemented as device 150*a* or device 150*c*. Display 302 displays a video event, e.g., a live soccer game.

In some examples, the video event is displayed via video pass-through depicting a display of an external electronic device. Accordingly, display 302 and the display of the external electronic device concurrently display the video event. For example, in FIG. 3A, while the external device (e.g., a television, a computer, or a tablet) displays the soccer game, display 302 concurrently displays the soccer game via video pass-through of the external device. In other examples, the video event is not displayed via video-pass through. For example, device 300 streams the video event via an internet connection or displays the video event that is stored in local memory of device 300.

Figure 3A:
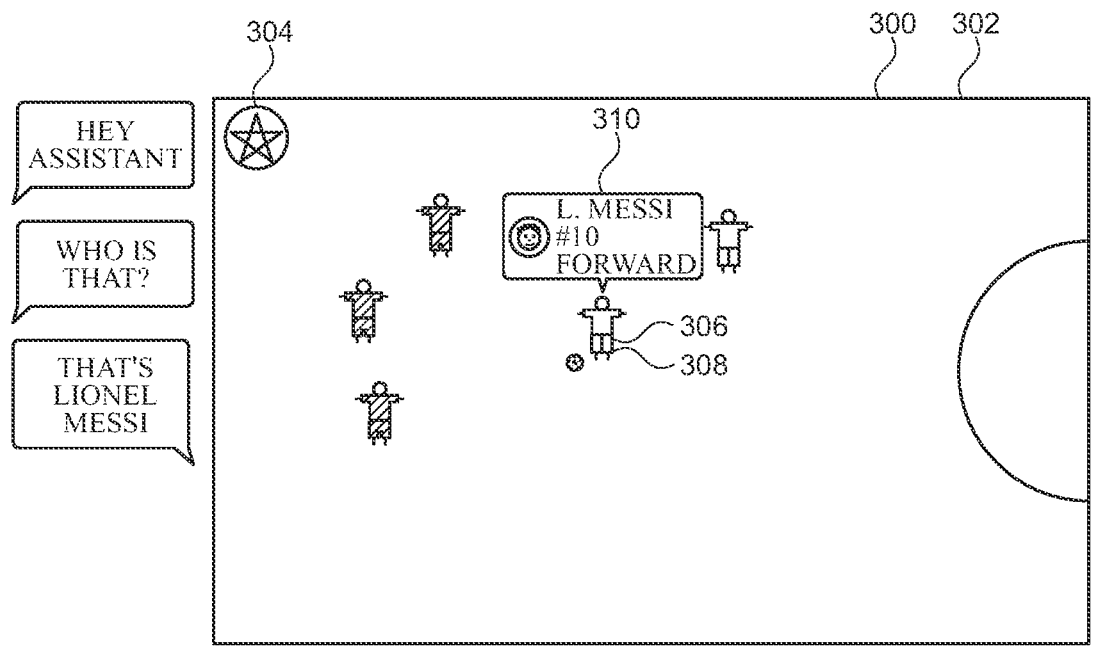
FIGS. 3A-3H illustrate various manners of augmenting the display of video events with graphical overlays, according to various examples.

In some examples, while display 302 displays the video event, device 300 receives input to invoke DA 200. Example input to invoke DA 200 includes speech input including a predetermined spoken trigger (e.g., "hey assistant," "turn on," and the like), predetermined types of gesture input (e.g., hand motions) detected by device 300, and selection of a physical or virtual button of device 300. In some examples, input to invoke DA 200 includes user gaze input, e.g., indicating that user gaze is directed to a particular displayed user interface element for a predetermined duration. In some examples, device 300 determines that user gaze input is input to invoke DA 200 based on the timing of received natural language input relative to the user gaze input. For example, user gaze input invokes DA 200 if device 300 determines that user gaze is directed to the user interface element at a start time of the natural language input and/or at an end time of the natural language input. In the example of FIG. 3A, a user provides the spoken trigger "hey assistant" to invoke DA 200.

In FIG. 3A, DA 200 invokes. For example, device 300 displays DA indicator 304 to indicate invoked DA 200 and begins to execute certain processes corresponding to DA 200. In some examples, once DA 200 invokes, DA 200 processes received natural language input to augment the display of the video event with various types of graphical overlays, discussed below. For simplicity, the description of FIGS. 3C-3H below does not explicitly describe receiving input to invoke DA 200. However, it will be appreciated that, in some examples, DA 200 processes the natural language inputs described with respect to FIGS. 3C-3H in accordance with receiving input to invoke DA 200.

In some examples, a user provides a natural language input to DA 200 (and causes DA 200 to process the natural language input) without providing input to invoke DA 200. For example, DA 200 determines, based on various conditions associated with the natural language input, that the natural language input is intended for DA 200 and thus processes the natural language input. For example, a condition includes that a user gesture corresponds to (e.g., the user points or gestures at) a location on display 302 when receiving the natural language input. Thus, if DA 200 determines that a user gesture corresponds to a location on display 302 when receiving the natural language input, DA 200 processes the natural language input without requiring input to invoke DA 200. As another example, a condition includes that the natural language input corresponds to a user intent associated with the video event. For example, DA 200 processes received natural language inputs to determine whether they correspond to predetermined types of user intents (e.g., an intent to identify a participant in the video event, an intent to pause, rewind, and/or fast-forward the video event, an intent to request further information about the video event, an intent to locate a participant in the video event). If DA 200 determines that a natural language input corresponds to a user intent associated with the video event, DA 200 processes the natural language input to display a graphical overlay without requiring input to invoke DA 200.

In FIG. 3A, while display 302 displays the video event, DA 200 receives a natural language input corresponding to participant 306 of the video event. Participants of video events includes players and other entities involved in the video event, e.g., coaches, referees, linesmen, spectators, actors, actresses, animated characters, and the like. In some examples, the natural language input does not explicitly specify participant 306 but includes a deictic reference to participant 306, e.g., "that," "he," "she," "they," and the like. For example, after being invoked, DA 200 receives the natural language input "who is that?". The natural language input includes a request to identify participant 306, e.g., a player in the soccer game. As discussed below, responsive to the natural language input, DA 200 identifies location 308 of participant 306, uses identified location 308 to resolve the deictic reference (e.g., identify the player corresponding to "that"), and displays graphical overlay 310 indicating identified participant 306.

In accordance with receiving the natural language input, DA 200 identifies location 308 (e.g., a displayed location) of participant 306. DA 200 identifies location 308 based on context information associated with the video event, discussed below. In some examples, DA 200 further determines that a user intent corresponding to the natural language input is to identify participant 306 and identifies participant 306 in accordance with determining the user intent.

In some examples, device 300 detects user gaze data and the context information includes the detected user gaze data. The user gaze data includes, for instance, data captured by image sensor(s) 105, e.g., data captured by camera(s) of device 300 configured to track a user's gaze. In some examples, the user gaze data includes data captured by orientation sensor(s) 110 (e.g., data indicating a user's head pose) that DA 200 can use to determine a user's gaze location. In some examples, the gaze data indicates where (e.g., on display 302) the user gazes over time, e.g., indicates that the user gazes at a particular location at a particular time.

In some examples, identifying location 308 of participant 306 includes determining, based on the user gaze data, that a user gaze is directed to location 308 of participant 306. In some examples, the timing of the user gaze data used to identify location 308 depends on the tense of the natural language input. For example, if a natural language input refers to participant 306 in the present tense (e.g., "who is that?") user gaze is currently directed to participant 306's location, e.g., directed to participant 306's location while DA 200 receives at least a portion of the natural language input. In contrast, if a natural language input refers to participant 306 in the past tense (e.g., "who was that?"), the user's previous gaze (e.g., gaze before receiving the natural language input) may have been directed to a previous displayed location of participant 306. FIGS. 3C-3D below describe techniques for handling natural language inputs that refer to participants in the past tense.

In the example of FIG. 3A, DA 200 determines that the natural language input "who is that?" refers to participant 306 in the present tense. For example, NLP module 204 performs a grammatical and/or syntactic analysis of the natural language input to determine the tense. In some examples, in accordance with a determination that the natural language input refers to participant 306 in the present tense, DA 200 identifies location 308 of participant 306 as the location at which user gaze is directed at a current time. In some examples, the current time (e.g., of the video event) corresponds to a start time of the language natural input, to when DA 200 is invoked, or to a current timestamp of the displayed video event. For example, in FIG. 3A, DA 200 identifies location 308 of participant 306 by determining that user gaze is directed to location 308 when the user starts to speak "who is that?".

Sometimes, the time when a user gazes at participant 306 does not exactly match the current time. For example, the user may gaze at participant 306 slightly before and/or slightly after speaking "who is that?". Accordingly, in some examples, in accordance with a determination that the natural language input refers to participant 306 in the present tense, DA 200 analyzes user gaze data within a predetermined time window around the current time to identify location 308. The analyzed user gaze data includes, for instance, buffered gaze data (e.g., detected before the current time), gaze data detected while receiving the natural language input, and/or gaze data detected after an end time of the natural language input. In some examples, DA 200 analyzes the user gaze data using a prediction model (e.g., a machine-learned model implemented in identification module 208) to identify location 308. For example, the prediction model analyzes the user gaze data concurrently with the corresponding display of the video event to identify the time(s) when user gaze is directed to a displayed entity (e.g., a human participant) and the corresponding gazed-at location(s) (e.g., location 308) of the entity. In some examples, the training data for the prediction model includes user gaze data and a corresponding display of a video event. In some examples, the training data is annotated to indicate when a user gazes at an entity and the corresponding displayed location of the entity.

In some examples, device 300 detects user gesture input and the context information includes the detected user gesture input. Accordingly, in some examples, identifying location 308 of participant 306 includes determining that the user gesture input (e.g., representing a tap or pointing gesture) corresponds to location 308. For example, DA 200 determines that the gesture input corresponds to location 308 at a particular time, e.g., the current time, while receiving any portion of the natural language input, within a predetermined duration before receiving the natural language input, and/or within a predetermined duration after receiving the natural language input. In some examples, DA 200 determines that the gesture input corresponds to location 308 at the particular time in accordance with determining that the natural language input refers to participant 306 in the present tense. In this manner, DA 200 can identify location 308 by determining that the user points at location 308 when starting to speak "who is that?".

In some examples, DA 200 further analyzes the display of the video event at identified location 308 using context information to identify participant 306. The context information includes, for instance, information corresponding to opposing parties (e.g., opposing teams, opposing participants) of the video event. The information corresponding to opposing parties includes, for instance, respective jersey numbers of the participants of the opposing parties, respective identities corresponding to the jersey numbers, and/or respective jersey designs (e.g., colors, patterns, other visual characteristics) of the opposing parties. For example, for the currently displayed soccer game, DA 200 accesses the jersey colors of the opposing teams and rosters of both teams indicating the player identities and corresponding jersey numbers. In some examples, the context information includes information corresponding to any participant of the video event, e.g., information indicating the participant's costume, outfit, and/or jersey number. For example, for a doubles tennis or doubles volleyball match, the context information indicates the respective outfits (e.g., outfit color, outfit style) of each participant. As another example, for a concert, the context information indicates the respective costumes of each musician in the concert, e.g., if each musician has a signature performance costume.

In some examples, the context information includes an audio stream of the video event. For example, the audio stream includes commentary of the video event. In some examples, the context information includes an annotated event stream of the video event. For example, the annotated event stream represents a timeline of the video event indicating the times of notable moments (e.g., start time, fouls, goals, substitutions, touchdowns, steals, time outs, a new play, records, kickoff, half time, overtime, a notable athlete appearing, a decided winner, dribbles (in soccer), ball interceptions, and the like) in the video event and optionally, the participant(s) corresponding to the notable moments. In some examples, DA 200 receives the annotated event stream from an external service, e.g., from a service that analyzes live events in real-time to generate the annotated event stream. In some examples, the context information incudes data representing facial and/or bodily features of participants in the video event, e.g., data enabling DA 200 to identify the participants using facial and/or body recognition.

In some examples, the context information further indicates respective role(s) of participant(s) in the video event. For example, for a soccer game, the context information indicates whether each player is a goalie, a midfielder, a forward, or a defender. As another example, for a baseball game, the context information indicates the participant who is the pitcher, the catcher, or the like. As another example, for a concert, the context information indicates the participant (e.g., of a band) who is the lead singer, the drummer, the keyboard player, the guitarist, or the like. In some examples, the context information indicates the popularity (e.g., as determined from social media data) of at least some of the participants of the video event. For example, the context information indicates the player who is most popular on their soccer team, e.g., based on having the largest social media following. In some examples, the popularity is represented by a ranking (e.g., relative to the participant's team or to all participants in the video event) and/or a numerical score, e.g., based on the participant's number of social media followers.

In FIG. 3A, DA 200 analyzes the display of the video event at location 308, and at the current time (or when user gaze at location 308 is otherwise detected), to identify participant 306. For example, DA 200 performs image recognition of the video event (e.g., a still frame of the video event) at the current time and around location 308 to identify an entity (e.g., person) at or near location 308. For example, the image recognition process implements a search process to identify the pixels in the vicinity of location 308 that form an entity. The image recognition thus identifies that an entity is at or near location 308 and further identifies visual features (e.g., jersey number, jersey design, facial and/or bodily features) of the entity. DA 200 matches the visual features to the above described context information to identify the entity as participant 306. For example, DA 200 determines that the entity has jersey number 10 and the team roster indicates Lionel Messi has jersey number 10, and thus identifies participant 306 as Lionel Messi.

In some examples, the visual features identified by the image recognition indicate a role of the entity. For example, the image recognition can determine, based on the entity's visual characteristics and/or relative location in the video event, whether the entity is a goalie, a pitcher, a drummer, a guitarist, or the like. DA 200 can thus match the determined role of the entity to the context information (indicating the roles of the participants) to identify the entity as a particular participant. For example, if DA 200 determines that the entity is a drummer, DA 200 increases a likelihood score of the participant(s) of the video event who are drummers.

In some examples, DA 200 additionally or alternatively identifies participant 306 using other techniques based on the context information. For example, DA 200 identifies participant 306 based on the audio stream of the video event. For example, DA 200 determines whether the audio stream of the video event, within a predetermined time window around the current time, includes the name of a participant. If so, DA 200 identifies participant 306 as the named participant or increases a likelihood of participant 306 being the named participant. In some examples, DA 200 identifies participant 306 based on an annotated event stream of the video event. For example, DA 200 analyzes the annotated event stream within a predetermined time window around the current time to determine whether the event stream indicates a participant. If so, DA 200 identifies participant 306 as the indicated participant or increases likelihood of participant 306 being the indicated participant. For example, users may more likely ask DA 200 to identify a participant if the participant is involved in a notable moment of the video event. If the participant is involved in the notable moment (e.g., scored a goal), the audio stream of the soccer game likely identifies the participant around the current time (e.g., "Goal for Lionel Messi!") and/or the event stream likely identifies the participant, e.g., by indicating a goal for Lionel Messi at a particular time.

As another example, DA 200 identifies participant 306 based on the popularity of participant 306, e.g., as indicated by the context data. For example, if two participants' respective likelihood scores are otherwise equal, DA 200 determines a higher likelihood score for the more popular participant. As another example, DA 200 assumes by default that participant 306 is the most popular participant, e.g., by increasing the most popular participant's likelihood score by a predetermined amount.

In some examples, in accordance with identifying participant 306 (e.g., based on the audio stream and/or annotated event stream), DA 200 identifies current location 308 of participant 306. For example, DA 200 performs image recognition on the video event at the current time to determine current location 308 based on participant 306's known features indicated by the context information (e.g., jersey design, jersey number, facial and/or bodily features).

In accordance with identifying current location 308, DA 200 augments the display of the video event with graphical overlay 310. Graphical overlay 310 is displayed at a display location corresponding to current location 308. For example, DA 200 selects a display location near (e.g., within a predetermined distance of) current location 308 that does not obscure the display of participant 306 with graphical overlay 310.

In some examples, DA 200 generates graphical overlays having different types and/or contents depending on the user intent corresponding to natural language input. For example, in FIG. 3A, because the natural language input "who is that?" includes a request to identify participant 306, DA 200 generates graphical overlay 310 including information corresponding to participant 306. The information indicates, for example, an identity of participant 306, one or more predetermined highlights (e.g., notable moments) corresponding to participant 306 (e.g., text or video describing notable moments of participant 306 in the video event), and/or statistics (e.g., distance ran, goals scored, passes completed, dribbles completed, tackles made, shots taken, and the like) corresponding to participant 306. In some examples, graphical overlay 310 indicates additional information about participant 306, such as a representation (e.g., picture or video) of participant 306, a position (e.g., forward, defender, goalie, quarterback) of participant 306, and/or general knowledge (e.g., an encyclopedia entry) about participant 306. In some examples, graphical overlay 310 indicates information about the video event, e.g., statistics and scores of the displayed game, knowledge (e.g., encyclopedia entries) about the teams of the video event, text and/or video description of notable moments in the video event, user-selectable links to view respective videos of the notable moments, and/or rosters of the opposing teams. In some examples, graphical overlay 310 indicates current location 308 of participant 306, e.g., includes a circle or other shape displayed under participant 306.

In some examples, device 300 receives a user input corresponding to a selection of graphical overlay 310. Example user input includes gesture input (e.g., a tap gesture) and/or speech input (e.g., "show me more about Lionel Messi"). In response to receiving the user input, display 302 displays a user interface including more detailed information about participant 306. For example, if the user selects graphical overlay 310 shown in FIG. 3A, display 302 displays a user interface providing more detail about Lionel Messi, e.g., Lionel Messi's statistics in the soccer game and/or text and/or video description of Lionel Messi's highlights in the soccer game.

In some examples, DA 200 further generates and provides output (e.g., audio output) corresponding to graphical overlay 310. The audio output indicates the identified participant. For example, DA 200 additionally outputs "that's Lionel Messi" while display 302 displays graphical overlay 310. In some examples, if DA 200 cannot determine location 308 (e.g., did not detect user gaze data or was unable to identify a user gaze location) and/or cannot identify participant 306 (e.g., image recognition cannot confidently identify participant 306), DA 200 provides an output indicating an error, e.g., "sorry, I don't know who that is."

While the above describes an example of augmenting the display of a sports game with a graphical overlay, DA 200 can augment the display of other types of video events with graphical overlays in a similar manner. As one example, the video event is a concert and the user may request DA 200 to identify a participant (e.g., a lead singer, a guitarist, a drummer) of the concert. DA 200 can identify the participant as discussed herein and display a graphical overlay at or near the identified participant's location. The graphical overlay includes, for example, general knowledge about the participant and/or a list of the participant's music albums or songs. As another example, the video event is a personal video (e.g., a home video recorded by a user's personal device) and the user can request DA 200 to identify a participant shown in the personal video. DA 200 can identify the participant as discussed herein (e.g., using facial and/or body recognition) and display a graphical overlay indicating the identity of the participant. As yet another example, the video event is a movie or news broadcast and the user can request DA 200 to identify a participant (e.g., news anchor, reporter, politician, actor, actress) of the movie or news broadcast. Further, the techniques discussed herein can apply to identifying participants depicted in a user's personal photos. For example, while viewing a photo, the user can ask DA 200 "who is that?". If DA 200 can confidently identify the referred-to participant (e.g., based on facial recognition and the user's gaze), DA 200 displays a graphical overlay indicating the participant's identity.

As discussed, DA 200 may augment the display of video events with other types of graphical overlays depending on the user intent corresponding to the natural language input. As a further example, suppose the video event is a concert and the user intent is to obtain further information about the concert, e.g., via natural language inputs such as "tell me about this show," "tell me about this tour," or "show me the song list." DA 200 can retrieve the requested information and augment the display of the concert with a graphical overlay indicating the requested information, e.g., general information about the concert, a list of stops on the tour, the song list for the concert. As another example, the user intent is to visualize the audio of the concert, e.g., via natural language inputs such as "visualize this song," "show me the chords," or "show me the lyrics." DA 200 can analyze the audio stream of the concert (e.g., to determine a corresponding waveform, to determine the chords being played, to recognize the current lyrics) and display a graphical overlay corresponding to the user intent, e.g., a live updated graphical overlay showing the waveform, showing the currently played chords, or showing the currently recognized lyrics.

Figure 3B:
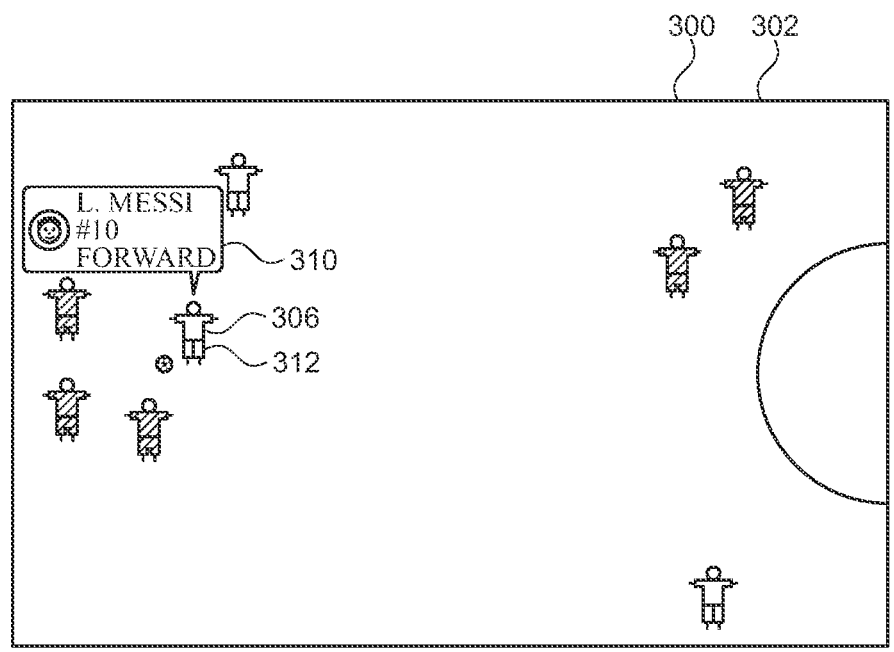
Figure 3C:
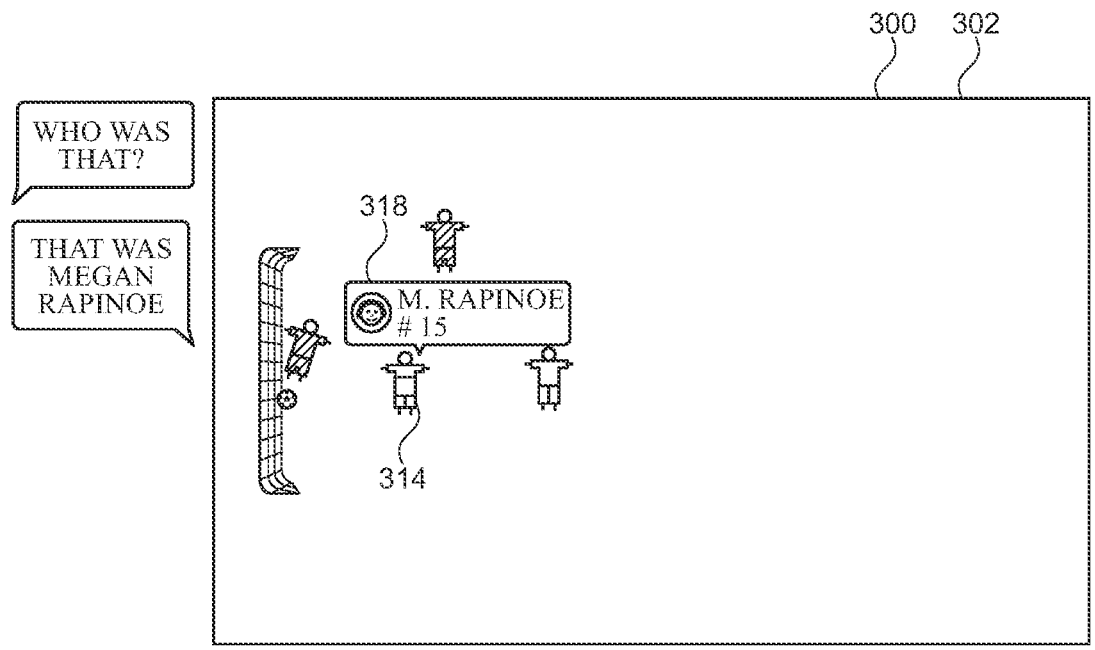
Figure 3D:
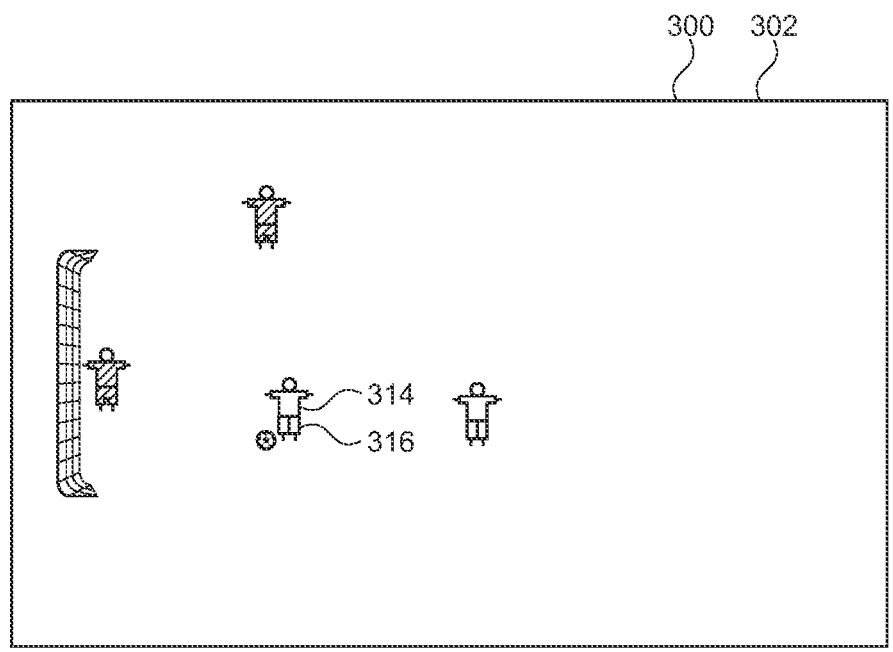

Turning to FIG. 3B, in some examples, graphical overlay 310 follows a location of participant 306. For example, DA 200 detects a change from location 308 of participant 306 to location 312 of participant 306, e.g., as Lionel Messi runs forward with the ball in the live soccer game. In some examples, DA 200 detects the change by analyzing the video event using image tracking technologies, e.g., by tracking the movement of participant 306 using participant 306's previously identified visual features. In response to detecting the change from location 308 to location 312, DA 200 displays, on display 302, graphical overlay 310 at an updated display location corresponding to location 312. In this manner, displays of graphical overlays can follow the displayed locations of the participants. In some examples, graphical overlay 310 follows the location for a predetermined time (e.g., 5 seconds or 10 seconds after initially displaying the graphical element) and then ceases to be displayed. In other examples, a user setting of device 300 defines the length for which to display graphical overlay 310. In other examples, display 302 displays graphical overlay 310 until ceasing to display the video event, or until device 300 receives user input instructing to cease display of graphical overlay 310.

FIGS. 3C-3D illustrate techniques for handling natural language inputs in the past tense that include requests to identify participant 314. In FIG. 3C, DA 200 receives the natural language input "who was that?". For example, participant 314 has just scored a goal in the soccer game and the user wants to know who scored the goal.

In some examples, in accordance with receiving the natural language input, DA 200 determines that a user intent corresponding to the natural language input is to identify participant 314. In some examples, in accordance with such determination, DA 200 identifies, based on the context information, a location of participant 314. For example, DA 200 identifies the currently displayed location of participant 314 to determine where to display graphical overlay 318 identifying participant 314. As discussed below, identifying the currently displayed location of participant 314 may include first identifying participant 314, and then identifying the currently displayed location of participant 314.

In some examples, DA 200 determines that the natural language input (e.g., "who was that?") refers to participant 314 in the past tense. In accordance with a determination that the natural language speech input refers to participant 314 in the past tense, DA 200 determines previously displayed location(s) at which the user was previously gazing. For example, DA 200 determines based on previous user gaze data (e.g., detected before the current time) that a previous user gaze was directed to one or more previously displayed locations. In some examples, the previous user gaze data analyzed by DA 200 is within a predetermined duration (e.g., 5 seconds, 10 seconds, 20 seconds, 30 seconds) before the current time. For example, responsive to receiving "who was that?", DA 200 analyzes user gaze data detected within 20 seconds beforehand to determine previously displayed location(s) at which the user gazed during the previous 20 seconds.

In some examples, DA 200 analyzes the previous display of the video event at the previously displayed location(s) using the context information to identify participant 314. For example, if device 300 detected user gaze once every second in the previous 20 seconds, DA 200 analyzes 20 different previously displayed locations the user gazed at, e.g., in 20 respective previous still frames of the video event. For example, consistent with the techniques discussed with respect to FIG. 3A, DA 200 performs image recognition on each still frame around each of the previously displayed location(s) to identify a displayed entity corresponding to each previously displayed location, e.g., by implementing a search process to detect an entity in the vicinity of each previously displayed location. In one example, the image recognition indicates that within the previous 20 seconds, the display location(s) most frequently correspond to the same entity (meaning in most of the previous 20 still frames, the user gazed at the same entity). DA 200 then matches identified visual features (e.g., jersey number and jersey color) of the most frequent entity to the context information to identify participant 314. For example, if the identified visual features match the context information, DA 200 increases a likelihood score of identifying participant 314 corresponding to the matching context information.

In some examples, DA 200 performs the above described process for each other detected entity (if any), e.g., entity(ies) the user less frequently gazed at in some of the previous still frames. For example, DA 200 matches identified visual features of the other entity(ies) to the context information to determine other participant(s) corresponding to the entity(ies), but assigns the other participant(s) lower likelihood scores because they were less frequently gazed at. As a specific example, if DA 200 determines that a user gazes at a first participant in 15 of the previous still frames and gazes at a second participant in 5 of the previous still frames, DA 200 assigns the first participant a higher likelihood score than the second participant.

To illustrate the above process, FIG. 3D shows a previous display (e.g., previous still frame) of the video event, such as display of the video event before participant 314 scores the goal in FIG. 3C. In FIG. 3D, DA 200 determines that the user previously gazed at previously displayed location 316 of participant 314. Accordingly, DA 200 identifies visual features (e.g., jersey color and number) of participant 314 and matches the visual features to the context information (e.g., team roster information) to identify participant 314.

In some examples, DA 200 alternatively or additionally uses other techniques based on the context information to identify participant 314, e.g., in accordance with a determination that the natural language input refers to the participant in the past tense. For example, DA 200 identifies participant 314 by performing facial and/or bodily recognition, e.g., of respective face(s) and/or body(ies) detected closest to the previously displayed location(s). For example, DA assigns a participant having their face and/or body more frequently recognized (e.g., in the previous still frames) a higher likelihood score than a participant having their face and/or body less frequently recognized. As another example, DA 200 identifies participant 314 based on the audio stream of the video event. For example, DA 200 determines whether the audio stream of the video event, at and/or within a predetermined duration before the current time, includes name(s) of participant(s). If so, DA 200 increases a likelihood score of identifying the named participant(s). As another example, DA 200 identifies participant 314 based on an annotated event stream of the video event. For example, DA 200 analyzes the event stream, at and/or within a predetermined duration before the current time, to determine whether the event stream indicates participant(s). If so, DA 200 increases the likelihood score of identifying the indicated participant(s). In some examples, consistent with that discussed with respect to FIG. 3A, DA 200 identifies participant 314 based on the user's gaze at the current time. For example, if DA 200 identifies a candidate participant based on the user's current gaze location, DA 200 increases a likelihood score of identifying the candidate participant as the correct participant 314.

In some examples, DA 200 identifies participant 314 based on participant 314's popularity, e.g., in a manner similar to that discussed above. For example, DA 200 increases the likelihood scores of participants to bias towards identifying more popular participants. In this manner, DA 200 can determine that natural language inputs such as "who was that?" more likely refer to more popular participants.

In the present example, according to the above discussed techniques, DA 200 identifies participant 314 as Megan Rapinoe. For example, DA 200 determines that within 20 seconds before receiving the natural language input "who was that?", the user was most frequently gazing at Megan Rapinoe, the audio stream of the video event includes Megan Rapinoe's name (e.g., "Megan Rapinoe has the ball"), and/or an event stream of the video event indicates that Megan Rapinoe was passed the ball or scored a goal.

In some examples, in accordance with identifying participant 314, DA 200 identifies participant 314's currently displayed location. For example, after identifying participant 314, DA 200 performs image recognition on the current display of the video event in FIG. 3C, using context information corresponding to participant 314 (e.g., Megan Rapinoe's jersey number, jersey design, facial and/or bodily features), to identify participant 314's currently displayed location. In accordance with identifying participant 314's currently displayed location, DA 200 augments the display of the video event with graphical overlay 318 displayed at a display location corresponding to participant 314's currently displayed location.

In some examples, DA 200 further optionally provides other output (e.g., audio output) identifying participant 314, e.g., "that was Megan Rapinoe." In some examples, if DA 200 cannot identify the current location of participant 314 (e.g., if display 302 does not currently display Megan Rapinoe), DA 200 provides the output without displaying graphical overlay 318. In some examples, if DA 200 cannot identify participant 314 (e.g., if no participant has a sufficiently high likelihood score), DA 200 provides an output indicative of an error, e.g., "sorry, I don't know who that was."

Figure 3E:
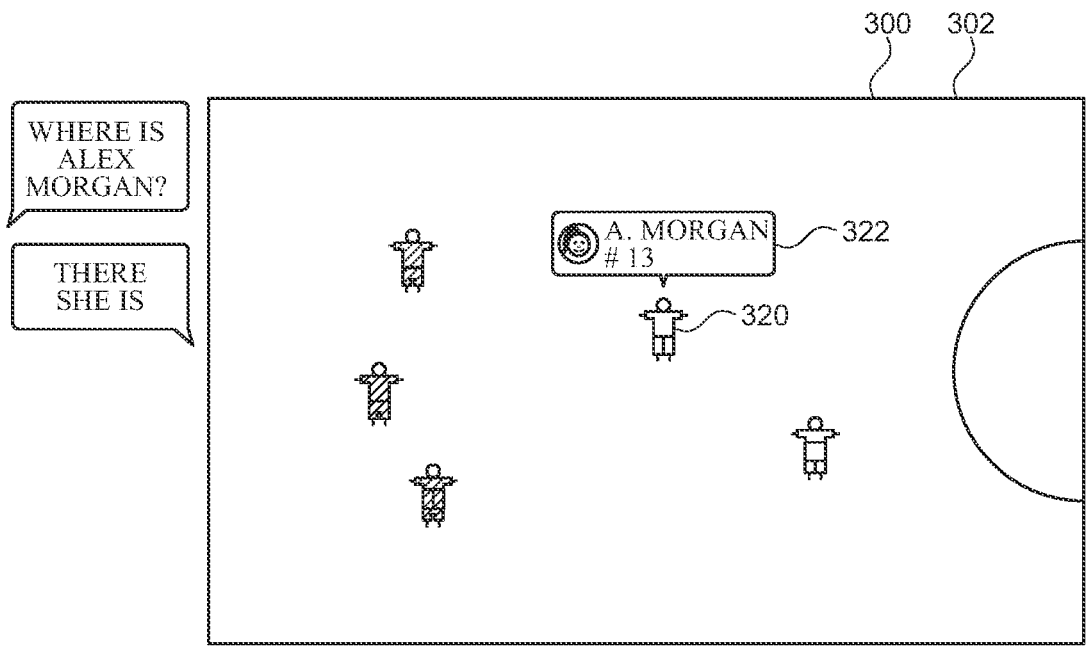

FIG. 3E shows an example where the natural language input specifies participant 320 and includes a request to locate participant 320. For example, while display 302 displays a video event, a user asks DA 200 "where is Alex Morgan?".

In accordance with receiving the natural language input, DA 200 identifies, based on the context information, a location of participant 320. For example, DA 200 determines a user intent to locate participant 320 and then performs image recognition to locate participant 320. For example, DA 200 retrieves context information corresponding to specified participant 320 (e.g., jersey number, jersey design, facial and/or bodily features) and analyzes the display of the video event at the current time to detect participant 320 matching the context information.

In accordance with identifying the location of participant 320, DA 200 augments the display of the video event with graphical overlay 322 displayed at a display location corresponding to the identified location. For example, graphical overlay 322 in FIG. 3E indicates the location of participant 320 Alex Morgan. In some examples, DA 200 further provides output indicating the located participant. For example, DA 200 speaks "there she is" while display 302 displays graphical overlay 322. In some examples, if DA 200 is unable to locate participant 320 (e.g., if Alex Morgan is not currently displayed and/or image recognition fails to identify Alex Morgan), DA provides an output indicating that participant 320 cannot be located (e.g., "I can't find Alex Morgan") and forgoes displaying graphical overlay 322.

Figure 3F:
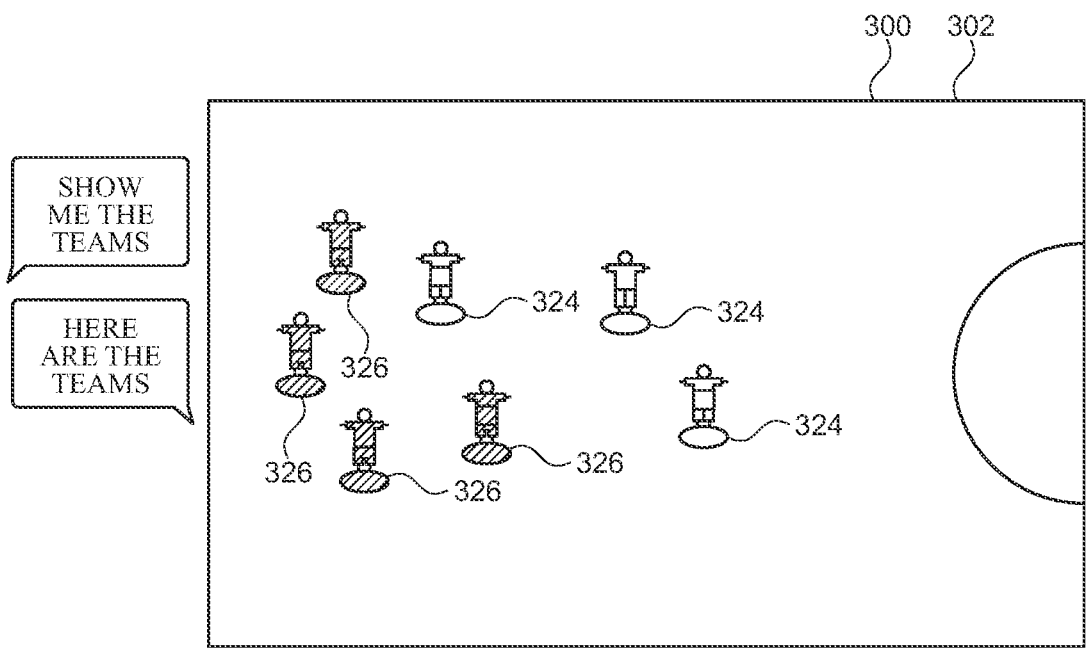

FIG. 3F shows an example where a natural language input includes a request to visually distinguish between a first party (e.g., team or individual participant) of the video event and an opposing second party (e.g., opposing team or opposing individual participant) of the video event. For example, while display 302 displays a live soccer game, a user asks DA 200 to "show me the teams." Other example natural language inputs including requests to visually distinguish between parties include "highlight the teams," "distinguish the teams," "highlight the players," and the like.

In accordance with receiving the natural language input, DA 200 determines that the natural language input includes a request to visually distinguish between the first party and the opposing second party, e.g., by determining a user intent to visually distinguish between the parties. In accordance with such determination, DA 200 identifies, based on context information, the location(s) of first participant(s) corresponding to the first party (first location(s)) and the location(s) of second participant(s) corresponding to the opposing second party (second location(s)). For example, DA 200 performs image recognition on the currently displayed video event to identify the first location(s) (e.g., based on the jersey design of the first party) and to identify the second location(s) (e.g., based on the jersey design of the second party). In accordance with identifying the first location(s), DA 200 augments the display of the video event with first graphical overlay 324 displayed at first display location(s) respectively corresponding to the first location(s). Similarly, in accordance with identifying the second location(s), DA 200 augments the display of the video event with second graphical overlay 326 displayed at second display location(s) respectively corresponding to the second location(s).

In some examples, display 302 concurrently displays first graphical overlay 324 and second graphical overlay 326 and displays first graphical overlay 324 in a different manner than second graphical overlay 326 (e.g., different color, shape, brightness, size, shading). In this manner, as shown in FIG. 3F, DA 200 may visually distinguish between opposing parties of the video event based on, e.g., identifying the different jersey designs of the opposing parties.

In some examples, DA 200 further provides output (e.g., audio output) indicating the visually distinguished parties. For example, while display 302 displays graphical overlays 324 and 326, DA 200 outputs "here are the teams."

In some examples, consistent with that discussed with respect to FIG. 3B, graphical overlays 324 and 326 follow the location(s) of the respective participants. For example, DA 200 continues to track the first and second location(s) (e.g., by using image recognition to track the movements of the opposing jersey designs) as the video event progresses and updates the displayed locations of graphical overlays 324 and 326 accordingly. In some examples, graphical overlays 324 and 326 remain displayed for a predetermined duration and cease to be displayed after the predetermined duration. In other examples, graphical overlays 324 and 326 are displayed until display 302 ceases displaying the video event or until device 300 receives input instructing to cease display of graphical overlays 324 and 326.

Figure 3G:
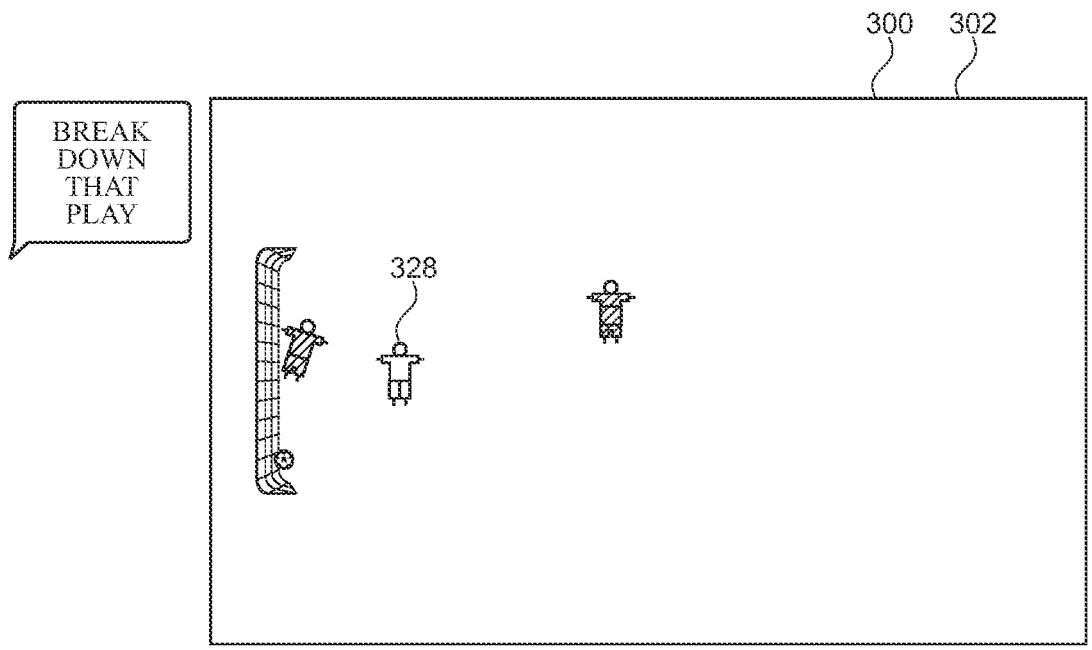

FIG. 3G illustrates an example where the natural language input includes a request to analyze an occurrence (e.g., play, goal, scoring event, new record, foul, and the like) of the video event. For example, while display 302 displays a video event, DA 200 receives the natural language input "break down that play." Other example natural language inputs including requests to analyze occurrences of video events include "analyze that play," "show me that again," "what happened?", "show me a replay," "explain what just happened," and the like.

In some examples, DA 200 determines that the natural language input includes a request to analyze an occurrence of the video event, e.g., by determining a corresponding intent. In accordance with such determination, DA 200 causes display 302 to display a replay of the occurrence. In some examples, the time of the video event at which the replay starts (reply start time) is a predetermined duration before a current time of the video event. In some examples, DA 200 uses the annotated event stream of the video event to determine the replay start time. For example, DA 200 determines, based on the annotated event stream, when a most recent notable moment (e.g., goal) occurred and determines the replay start time as a predetermined duration before the most recent notable moment occurring. As another example, if the annotated event stream indicates a start time of each new play (e.g., in American football), DA 200 determines the replay start time as the start time of the most recent play.

Figure 3H:
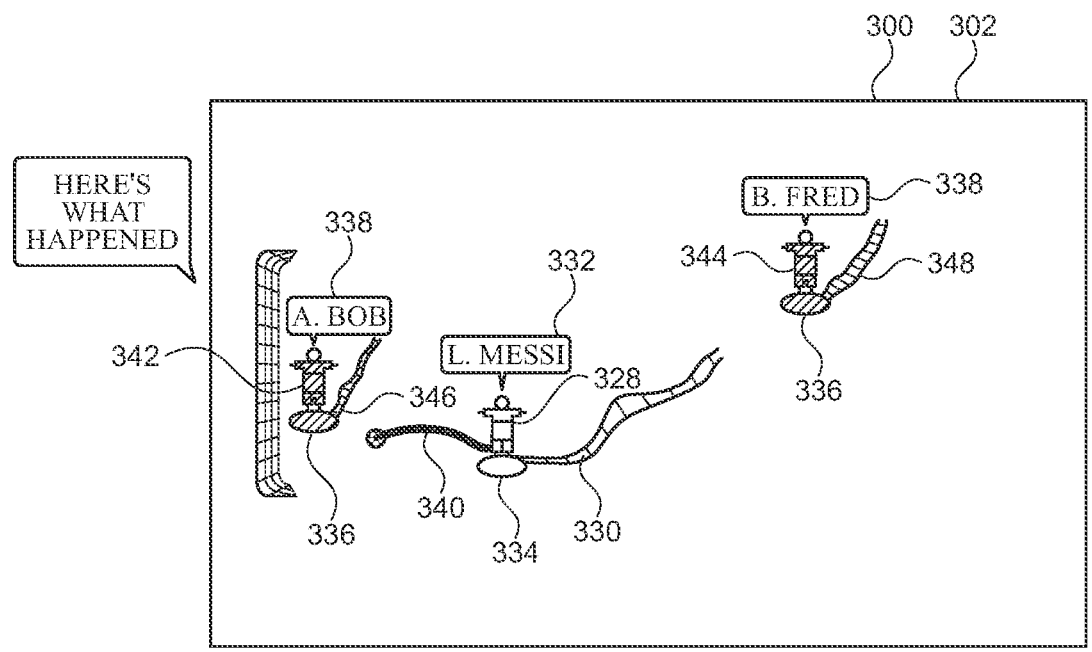

FIG. 3H shows a displayed replay of an occurrence of a video event. For example, participant 328 has just scored a goal in FIG. 3G and FIG. 3H shows a replay of the events before the goal. The replay of the video event can include various types of graphical overlays generated by DA 200, as discussed below.

In some examples, in accordance with receiving the natural language input, DA 200 identifies, based on the context information, a location of participant 328 corresponding to the natural language input. Participant 328 may be the person of interest primarily involved in the occurrence, e.g., goal scorer, person who broke a record, person who committed a foul, person who ran with the ball, and the like. In the present example, the identified location of participant 328 is a location (e.g., displayed location) in the replay of the occurrence. For example, in FIG. 3H, DA 200 identifies the displayed location of participant 328 (e.g., the goal scorer) in the replay so DA 200 can augment the replay with graphical overlay 330 to emphasize participant 328 of interest.

In some examples, identifying the location of participant 328 includes identifying participant 328 based on context information associated with the video event. Accordingly, responsive to a user request to analyze an occurrence of the video event, DA 200 may automatically identify participant 328 of interest in the occurrence and emphasize participant 328 via graphical overlay 330. DA 200 identifies participant 328 according to the techniques discussed above with respect to FIGS. 3A-3D. For example, DA 200 analyzes the user's previous gaze data (e.g., between the replay start time and the current time) to identify participant 328, e.g., as previous user gaze was likely directed to participant 328 of interest. As another example, DA 200 analyzes the event stream of the video event at and/or within a predetermined duration before the current time to identify participant 328, e.g., as the event stream likely indicates participant 328 involved in the occurrence. As yet another example, DA 200 identifies participant 328 based on their popularity, e.g., by determining a high likelihood score of participant 328 because they are the most popular player in the game. In the example of FIG. 3H, DA 200 identifies participant 328 as Lionel Messi.

In some examples, in accordance with a determination that the natural language input includes a request to analyze the occurrence of the video event, DA 200 identifies, based on the context information, other participant(s) corresponding to the occurrence. The other participant(s) may be people involved in the occurrence other than the primary person of interest, e.g., participant 328. For example, the other participant(s) may be the players who participant 328 dribbled past to score the goal, the player who had a pass intercepted, a defensive player who tackled the quarterback (in football), the goalie who was scored against, and the like. DA 200 identifies the other participant(s) according to the same techniques used to identify participant 328. For example, DA 200 determines likelihood scores of the participants in the replay based on the context information (e.g., by determining higher likelihood scores for participants the user more frequently gazed at in previous still frames, by determining likelihood scores based on whether the event stream and/or audio stream of the video event name the participant(s), by determining higher likelihood scores for more popular participants). DA 200 then identifies the participant(s) having the highest likelihood scores, e.g., the ones having likelihood scores above a threshold. In FIG. 3H, for instance, DA additionally identifies participant 342 (the goalie A. Bob) and participant 344 (the defender B. Fred). Participant 328's likelihood score may be higher than each of participant 342 and 344's respective likelihood scores, e.g., as participant 328 is the primary person of interest.

In some examples, in accordance with identifying participant(s) (e.g., participants 328, 342, and 344), DA 200 identifies the respective location(s) (e.g., location(s) in the displayed replay) of the participant(s) based on the context information. For example, DA 200 performs image recognition on the replay using visual features of identified participant 328 (e.g., jersey color, jersey number, facial and/or bodily features) to identify the location of participant 328 and performs a similar process to identify the respective locations of participants 342 and 344. In some examples, DA 200 further tracks the respective location(s) of the identified participant(s) in the replay, e.g., using image recognition to track the identified participant(s)' visual features.

In some examples, in accordance with identifying the respective location(s) of the participant(s), DA 200 augments the display of the video event with graphical overlay(s) displayed at respective display location(s) (e.g., in the replay) corresponding to the respective identified location(s) of the participant(s). In some examples, the graphical overlay(s) indicate respective trajectory(ies) (e.g., path(s) taken) of the identified participant(s). For example, in FIG. 3H, the graphical overlays 330, 346, and 348 indicate respective trajectories of participants 328, 342, and 344. DA 200 generates the trajectories by tracking the movement of the participants 328, 342, and 344 in the replay, e.g., based on their identified visual features. In some examples, in accordance with identifying the respective location(s) of the participant(s), DA 200 further provides output indicating an analysis of the occurrence, e.g., "here's what happened."

In some examples, consistently with the techniques discussed above, DA 200 augments the display of the replay with various other types of graphical overlays. For example, graphical overlay 332, displayed at a location corresponding to the location of participant 328, indicates an identity of participant 328. Graphical overlays 334 and 336 visually distinguish between participants of opposing parties involved in the occurrence. In some examples, graphical overlays 334 and 336 follow the locations of the corresponding participants during the replay, e.g., based on DA 200 tracking the movements of the corresponding participants. Graphical overlays 338 indicate the respective identity(ies) of any other participant(s) different from primary participant 328, e.g., who DA 200 identifies by performing image recognition on the replay. Graphical overlay 340 indicates a ball trajectory, e.g., based on DA 200 performing image tracking on the ball. In some examples, a user setting of device 300 defines the various types of graphical overlays displayed in the replay. For example, a user setting specifies whether to display graphical overlays 334 and 336 distinguishing between opposing parties and another user setting specifies whether to display graphical overlay 340 indicating a ball trajectory.

The above examples describe augmenting the display of the video event with graphical overlays displayed during the replay. For example, graphical overlays 330, 346, and 348 can change (e.g., grow longer) during the replay to indicate the respective trajectory(ies) of participants 328, 342, and 344. In some examples, display 302 displays some graphical overlays at a start of the replay. For example, display 302 displays graphical overlay(s) indicating the trajectory(ies) of identified participant(s) during the replay (e.g., graphical overlays 330, 346, and 348) and/or a graphical overlay indicating the ball trajectory during the replay (e.g., graphical overlay 340) at a start of the replay, and optionally, during the entirety of the replay. In this manner, the replay shows the identified participant(s) moving according to respective pre-indicated trajectory(ies) (e.g., shows participants 328, 342, and 344 running over respective graphical overlays 330, 346, and 348). Accordingly, during the replay, a user can determine where a participant and/or a ball will move next, thereby providing a more informative user experience.

Figure 4:
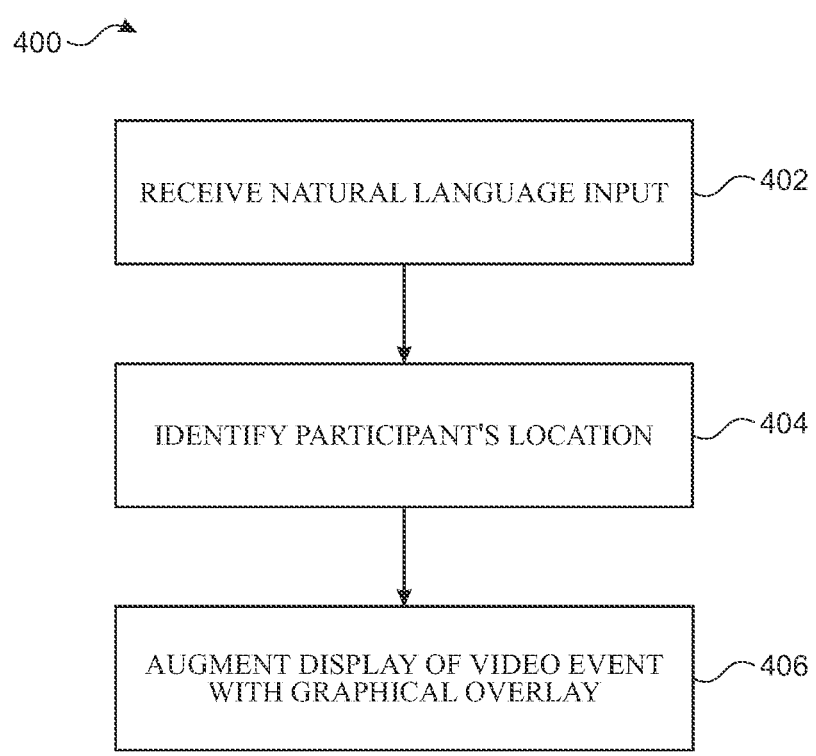
FIG. 4 illustrates a process for augmenting the display of a video event with a graphical overlay, according to various examples.

FIG. 4 illustrates process 400 for augmenting the display of a video event with a graphical overlay, according to various examples. Process 400 is performed, for example, at a device (e.g., device 300) and using DA 200 and system 150. In process 400, some operations are, optionally, combined, the orders of some operations are, optionally, changed, and some operations are, optionally, omitted. In some examples, additional operations are performed in combination with process 400.

At block 402, while displaying, on a display (e.g., display 302) of an electronic device (e.g., device 300), a video event, a natural language speech input corresponding to a participant of the video event (e.g., "who is that?", "who was that?", "where is Alex Morgan?", "show me the teams," and "break down that play" in FIGS. 3A, 3C, 3E, 3F, and 3G, respectively) is received by a digital assistant (e.g., DA 200) operating on the electronic device. In some examples, the video event is displayed via video pass-through depicting a second display of an external electronic device and the display and the second display concurrently display the video event. In some examples the natural language speech input (e.g., "who is that?", "who was that?") includes a request to identify the participant.

At block 404, while displaying the video event and in accordance with receiving the natural language speech input, a first location of the participant is identified by the digital assistant (e.g., using identification module 208) based on context information associated with the video event. In some examples, a user gesture input is detected, where the context information includes the detected user gesture input.

In some examples, identifying the first location of the participant includes determining that the user gesture input corresponds to the first location at a start time of the natural language speech input and analyzing the display of the video event at the first location (e.g., using identification module 208) using the context information associated with the video event to identify the first participant. In some examples, the respective locations of participants of video events are continuously identified, e.g., whenever a video event is displayed. For example, during display of a video event, the digital assistant continuously tracks the displayed locations of the participants, e.g., by using image recognition track the movement of human bodies. When the digital assistant receives the natural language speech input, the digital assistant determines the location relevant to the user request (e.g., the location of the participant corresponding to the speech input) according to the techniques discussed herein.

In some examples, user gaze data is detected, where the context information includes the detected user gaze data. In some examples, identifying the first location of the participant includes determining, based on the user gaze data, that a user gaze is directed to the first location and analyzing the display of the video event at the first location (e.g., using identification module 208) using the context information associated with the video event to identify the first participant. In some examples, the context information further includes information corresponding to opposing parties of the video event.

In some examples, it is determined (e.g., by NLP module 204) that the natural language speech input refers to the participant in the present tense. In some examples, determining that the user gaze is directed to the first location includes determining, in accordance with a determination that the natural language speech input refers to the participant in the present tense, that the user gaze is directed to the first location (e.g., location 308 in FIG. 3A) at a start time of the natural language speech input.

In some examples, it is determined (e.g., by NLP module 204) that the natural language speech input refers to the participant in the past tense. In some examples, in accordance with a determination that the natural language speech input refers to the participant in the past tense, it is determined (e.g., by identification module 208), based on previous user gaze data detected before a start time of the natural language speech input, that a previous user gaze was directed to a previously displayed location (e.g., location 316 in FIG. 3D). In some examples, in accordance with a determination that the natural language speech input refers to the participant in the past tense, the display of the video event at the previously displayed location is analyzed using the context information associated with the video event (e.g., by identification module 208) to identify the participant. In some examples, the first location of the participant is a currently displayed location of the participant (e.g., the location of participant 314 in FIG. 3C) and identifying the currently displayed location of the participant is performed in accordance with identifying the participant. In some examples, the context information associated with the video event includes at least one of: information corresponding to opposing parties of the video event, an audio stream of the video event, and an annotated event stream of the video event.

At block 406, while displaying the video event and in accordance with identifying the first location of the participant, the display of the video event is augmented by the digital assistant (e.g., using display augmentation module 210) with a graphical overlay displayed at a first display location corresponding to the first location of the participant. In some examples, the graphical overlay (e.g., graphical overlays 310, 318, 332, and 338) includes information corresponding to the participant. In some examples, the information corresponding to the participant indicates at least one of an identity of the participant, a predetermined highlight corresponding to the participant, and statistics corresponding to the participant.

In some examples, the natural language speech input specifies the participant and includes a request to locate the participant (e.g., "where is Alex Morgan?"). In some examples, the graphical overlay (e.g., graphical overlay 322) indicates a location of the participant.

In some examples, the natural language speech input includes a request to visually distinguish between a first party of the video event and an opposing second party of the video event (e.g., "show me the teams"), where the participant corresponds to the first party. In some examples, in accordance with receiving the natural language speech input and a determination that the natural language speech input includes a request to visually distinguish between the first party and the opposing second party, a second location of a second participant of the video event is identified by the digital assistant (e.g. using identification module 208) based on the context information, where the second participant corresponds to the opposing second party. In some examples, in accordance with identifying the second location of the second participant, the display of the video event is augmented by the digital assistant (e.g., using display augmentation module 210) with a second graphical overlay (e.g., graphical overlay 326) displayed at a second display location corresponding to the second location of the second participant. In some examples, the graphical overlay (e.g., graphical overlay 324) and the second graphical overlay (graphical overlay 326) are concurrently displayed, and the graphical overlay is displayed in a different manner than the second graphical overlay when the graphical overlay and the second graphical overlay are concurrently displayed.

In some examples, the natural language speech input includes a request to analyze an occurrence of the video event (e.g., "break down that play"). In some examples, the graphical overlay (e.g., graphical overlay 330) indicates a trajectory of the participant (e.g., participant 328), the trajectory corresponding to the occurrence.

In some examples, in accordance with a determination that the natural language speech input includes a request to analyze the occurrence of the video event, a replay of the occurrence (e.g., in FIG. 3H) is displayed on the display. In some examples, the first location of the participant (e.g., participant 328) is a location in the replay of the occurrence and the first display location corresponds to the replay of the occurrence. In some examples, identifying the first location of the participant includes identifying (e.g., by identification module 208), based on the context information associated with the video event, the participant and in accordance with identifying the participant, identifying (e.g., by identification module 208), based on the context information associated with the video event, the first location.

In some examples, in accordance with a determination that the natural language speech input includes a request to analyze the occurrence of the video event, a second participant (e.g., participants 342 and 344) corresponding to the occurrence is identified (e.g., by identification module 208) based on the context information associated with the video event. In some examples, in accordance with identifying the second participant, a third location of the second participant in the replay is identified based on the context information.

In some examples, the display of the replay of the occurrence is augmented (e.g., using display augmentation module 210) with a second graphical overlay (e.g., graphical overlays 346 and 348) displayed at a third display location corresponding to the third location of the second participant, the second graphical overlay indicating a second trajectory of the second participant.

In some examples, the context information includes at least one: of second information corresponding to opposing parties of the video event, a second audio stream of the video event, and a second annotated event stream of the video event. In some examples, the second information corresponding to the opposing parties of the video event indicates respective jersey numbers of the participants of the opposing parties, respective identities of the participants of the opposing parties, and respective jersey designs of the opposing parties.

In some examples, process 400 further includes detecting a change from the first location of the participant (e.g., location 308) to a second location of the participant (e.g., location 312) and in response to detecting the change, displaying (e.g., using display augmentation module 210), on the display, the graphical overlay (e.g., graphical overlay 310) at a second display location corresponding to the second location of the participant.

The operations discussed above with respect to FIG. 4 are optionally implemented by the components depicted in FIG. 2, e.g., by system 150 and DA 200.

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

Various techniques described in the present disclosure involve gathering and using personal information of a user. For example, the personal information (e.g., user gaze data) may be used to augment the displays of video events with graphical overlays. However, when the personal information is gathered, the information should be gathered with the user's informed consent. In other words, users of the XR systems described herein should have knowledge of and control over how their personal information is used.

Only appropriate parties should use the personal information, and the appropriate parties should only use the personal information for reasonable and legitimate purposes. For example, the parties using the personal information will comply with privacy policies and practices that, at a minimum, obey appropriate laws and regulations. Further, such policies should be well-established, user-accessible, and recognized as in compliance with, or to exceed, governmental/industrial standards. Additionally, these parties will not distribute, sell, or otherwise share such information for unreasonable or illegitimate purposes.

Users may also limit the extent to which their personal information is accessible (or otherwise obtainable) by such parties. For example, the user can adjust XR system settings or preferences that control whether their personal information can be accessed by various entities. Additionally, while some examples described herein use personal information, various other examples within the scope of the present disclosure can be implemented without needing to use such information. For example, if personal information (e.g., gaze data) is gathered, the systems can obscure or otherwise generalize the information so the information does not identify the particular user.

What is claimed is:

1. A non-transitory computer-readable storage medium storing one or more programs, the one or more programs comprising instructions, which when executed by one or more processors of an electronic device having a display, cause the electronic device to:
while displaying, on the display, a video event:
receive, by a digital assistant operating on the electronic device, a first natural language speech input corresponding to a first participant of the video event;
detecting a user gesture input;
in accordance with receiving the first natural language speech input, identify, by the digital assistant, based on context information associated with the video event, a first location of the first participant, including:
in accordance with a determination that the first natural language speech input refers to the first participant in the present tense, identifying the first location of the first participant as a location corresponding to the user gesture input when a portion of the first natural language speech input is received; and
in accordance with identifying the first location of the first participant, augment, by the digital assistant, the display of the video event with a first graphical overlay displayed at a first display location corresponding to the first location of the first participant.

2. The non-transitory computer-readable storage medium of claim 1, wherein the one or more programs further comprise instructions, which when executed by the one or more processors, cause the electronic device to:
detect a change from the first location of the first participant to a second location of the first participant; and
in response to detecting the change, display, on the display, the first graphical overlay at a second display location corresponding to the second location of the first participant.

3. The non-transitory computer-readable storage medium of claim 1, wherein:
the video event is displayed via video pass-through depicting a second display of an external electronic device; and
the display and the second display concurrently display the video event.

4. The non-transitory computer-readable storage medium of claim 1, wherein:
the first natural language speech input includes a request to identify the first participant; and
the first graphical overlay includes information corresponding to the first participant.

5. The non-transitory computer-readable storage medium of claim 4, wherein the information corresponding to the first participant indicates at least one of:
an identity of the first participant;
a predetermined highlight corresponding to the first participant; and
statistics corresponding to the first participant.

6. The non-transitory computer-readable storage medium of claim 4, wherein identifying the first location of the first participant includes:
analyzing the display of the video event at the first location of the first participant using the context information associated with the video event to identify the first participant.

7. The non-transitory computer-readable storage medium of claim 4, wherein the one or more programs further comprise instructions, which when executed by the one or more processors, cause the electronic device to:
detect user gaze data, wherein the context information includes the detected user gaze data, and wherein identifying the first location of the first participant includes:
determining, based on the user gaze data, that a user gaze is directed to the first location of the first participant; and
analyzing the display of the video event at the first location of the first participant using the context information associated with the video event to identify the first participant.

8. The non-transitory computer-readable storage medium of claim 6, wherein the context information further includes information corresponding to opposing parties of the video event.

9. The non-transitory computer-readable storage medium of claim 4, wherein the one or more programs further comprise instructions, which when executed by the one or more processors, cause the electronic device to:
determine that the first natural language speech input refers to the first participant in the past tense; and
in accordance with a determination that the first natural language speech input refers to the first participant in the past tense:
determine, based on previous user gaze data detected before a start time of the first natural language speech input, that a previous user gaze was directed to a previously displayed location;
analyze the display of the video event at the previously displayed location using the context information associated with the video event to identify the first participant, wherein:
the first location of the first participant is identified as a currently displayed location of the first participant; and
identifying the currently displayed location of the first participant is performed in accordance with identifying the first participant.

10. The non-transitory computer-readable storage medium of claim 9, wherein the context information associated with the video event includes at least one of:
information corresponding to opposing parties of the video event;
an audio stream of the video event; and
an annotated event stream of the video event.

11. The non-transitory computer-readable storage medium of claim 1, wherein the one or more programs further comprise instructions, which when executed by the one or more processors, cause the electronic device to:
while displaying, on the display, the video event:
receive, by the digital assistant operating on the electronic device, a second natural language speech input corresponding to a second participant of the video event, wherein the second natural language speech input specifies the second participant and includes a request to locate the second participant;

in accordance with receiving the second natural language speech input, identify, by the digital assistant, based on the context information associated with the video event, a first location of the second participant; and in accordance with identifying the first location of the second participant, augment, by the digital assistant, the display of the video event with a second graphical overlay displayed at a second display location corresponding to the first location of the second participant, wherein the second graphical overlay indicates the first location of the second participant.

12. The non-transitory computer-readable storage medium of claim 1, wherein the one or more programs further comprise instructions, which when executed by the one or more processors, cause the electronic device to:
while displaying, on the display, the video event:
receive, by the digital assistant operating on the electronic device, a second natural language speech input that the natural language speech input includes a request to visually distinguish between a first party of the video event and an opposing second party of the video event; and in accordance with receiving the second natural language speech input and a determination that the second natural language speech input includes the request to visually distinguish between the first party and the opposing second party:
identify, by the digital assistant, based on the context information associated with the video event:
a first location of a second participant of the video event, wherein the second participant corresponds to the first party; and
a first location of a third participant of the video event, the third participant corresponding to the opposing second party;

in accordance with identifying the first location of the second participant, augment, by the digital assistant, the display of the video event with a second graphical overlay displayed at a second display location corresponding to the first location of the second participant; and in accordance with identifying the first location of the third participant, augment, by the digital assistant, the display of the video event with a third graphical overlay displayed at a third display location corresponding to the first location of the third participant.

13. The non-transitory computer-readable storage medium of claim 12, wherein the second graphical overlay and the third graphical overlay are concurrently displayed, and wherein the second graphical overlay is displayed in a different manner than the third graphical overlay when the second graphical overlay and the third graphical overlay are concurrently displayed.

14. The non-transitory computer-readable storage medium of claim 1, wherein the one or more programs further comprise instructions, which when executed by the one or more processors, cause the electronic device to:
while displaying, on the display, the video event:
receive, by the digital assistant operating on the electronic device, a second natural language speech input that includes a request to analyze an occurrence of the video event, wherein the occurrence corresponds to a second participant of the video event;

in accordance with receiving the second natural language speech input, identify, by the digital assistant, based on the context information associated with the video event, a first location of the second participant; and in accordance with identifying the first location of the second participant, augment, by the digital assistant, the display of the video event with a second graphical overlay displayed at a second display location corresponding to the first location of the second participant, wherein the second graphical overlay indicates a trajectory of the second participant, the trajectory corresponding to the occurrence.

15. The non-transitory computer-readable storage medium of claim 14, wherein the one or more programs further comprise instructions, which when executed by the one or more processors, cause the electronic device to:
in accordance with a determination that the second natural language speech input includes the request to analyze the occurrence of the video event, display, on the display, a replay of the occurrence, wherein:
the first location of the second participant is a location in the replay of the occurrence; and
the second display location corresponds to the replay of the occurrence.

16. The non-transitory computer-readable storage medium of claim 15, wherein identifying the first location of the second participant includes:
identifying, based on the context information associated with the video event, the second participant; and
in accordance with identifying the second participant, identifying, based on the context information associated with the video event, the first location of the second participant.

17. The non-transitory computer-readable storage medium of claim 15, wherein the one or more programs further comprise instructions, which when executed by the one or more processors, cause the electronic device to:
in accordance with a determination that the second natural language speech input includes the request to analyze the occurrence of the video event:
identify, based on the context information associated with the video event, a third participant corresponding to the occurrence;
in accordance with identifying the third participant, identify, based on the context information associated with the video event, a first location of the third participant in the replay; and
augment the display of the replay of the occurrence with a third graphical overlay displayed at a third display location corresponding to the first location of the third participant, the third graphical overlay indicating a second trajectory of the third second participant.

18. The non-transitory computer-readable storage medium of claim 1, wherein the context information includes at least one of:
second information corresponding to opposing parties of the video event;
a second audio stream of the video event; and
a second annotated event stream of the video event.

19. The non-transitory computer-readable storage medium of claim 18, wherein the second information corresponding to the opposing parties of the video event indicates:

respective jersey numbers of participants of the opposing parties;
respective identities of the participants of the opposing parties; and
respective jersey designs of the opposing parties.

20. An electronic device comprising:
a display;
one or more processors;
a memory; and
one or more programs, wherein the one or more programs are stored in the memory and configured to be executed by the one or more processors, the one or more programs including instructions for:
while displaying, on the display, a video event:
receiving, by a digital assistant operating on the electronic device, a first natural language speech input corresponding to a first participant of the video event;
detecting a user gesture input;
in accordance with receiving the first natural language speech input, identifying, by the digital assistant, based on context information associated with the video event, a first location of the first participant, including:
in accordance with a determination that the first natural language speech input refers to the first participant in the present tense, identifying the first location of the first participant as a location corresponding to the user gesture input when a portion of the first natural language speech input is received; and
in accordance with identifying the first location of the first participant, augmenting, by the digital assistant, the display of the video event with a first graphical overlay displayed at a first display location corresponding to the first location of the first participant.

21. The electronic device of claim 20, wherein the one or more programs further include instructions for:
detecting a change from the first location of the first participant to a second location of the first participant; and
in response to detecting the change, displaying, on the display, the first graphical overlay at a second display location corresponding to the second location of the first participant.

22. The electronic device of claim 20, wherein:
the video event is displayed via video pass-through depicting a second display of an external electronic device; and
the display and the second display concurrently display the video event.

23. The electronic device of claim 20, wherein:
the first natural language speech input includes a request to identify the first participant; and
the first graphical overlay includes information corresponding to the first participant.

24. The electronic device of claim 23, wherein identifying the first location of the first participant includes analyzing the display of the video event at the first location of the first participant using the context information associated with the video event to identify the first participant.

25. The electronic device of claim 23, wherein the one or more programs further include instructions for:
detecting user gaze data, wherein the context information includes the detected user gaze data, and wherein identifying the first location of the first participant includes:
determining, based on the user gaze data, that a user gaze is directed to the first location of the first participant; and
analyzing the display of the video event at the first location of the first participant using the context information associated with the video event to identify the first participant.

26. The electronic device of claim 23, wherein the one or more programs further include instructions for:
determining that the first natural language speech input refers to the first participant in the past tense; and
in accordance with a determination that the first natural language speech input refers to the first participant in the past tense:
determining, based on previous user gaze data detected before a start time of the first natural language speech input, that a previous user gaze was directed to a previously displayed location;
analyzing the display of the video event at the previously displayed location using the context information associated with the video event to identify the first participant, wherein:
the first location of the first participant is identified as a currently displayed location of the first participant; and
identifying the currently displayed location of the first participant is performed in accordance with identifying the first participant.

27. The electronic device of claim 20, wherein the one or more programs further include instructions for:
while displaying, on the display, the video event:
receiving, by the digital assistant operating on the electronic device, a second natural language speech input corresponding to a second participant of the video event, wherein the second natural language speech input specifies the second participant and includes a request to locate the second participant;
in accordance with receiving the second natural language speech input, identifying, by the digital assistant, based on the context information associated with the video event, a first location of the second participant; and
in accordance with identifying the first location of the second participant, augmenting, by the digital assistant, the display of the video event with a second graphical overlay displayed at a second display location corresponding to the first location of the second participant, wherein the second graphical overlay indicates the first location of the second participant.

28. The electronic device of claim 20, wherein the one or more programs further include instructions for:
while displaying, on the display, the video event:
receiving, by the digital assistant operating on the electronic device, a second natural language speech input that includes a request to visually distinguish between a first party of the video event and an opposing second party of the video event; and
in accordance with receiving the second natural language speech input and a determination that the second natural language speech input includes the request to visually distinguish between the first party and the opposing second party:
identifying, by the digital assistant, based on the context information associated with the video event:
a first location of a second participant of the video event, wherein the second participant corresponds to the first party; and a first location of a third participant of the video event, the third participant corresponding to the opposing second party;

in accordance with identifying the first location of the second participant, augmenting, by the digital assistant, the display of the video event with a second graphical overlay displayed at a second display location corresponding to the first location of the second participant; and in accordance with identifying the first location of the third participant, augmenting, by the digital assistant, the display of the video event with a third graphical overlay displayed at a third display location corresponding to the first location of the third participant.

29. The electronic device of claim 20, wherein the one or more programs further include instructions for:

while displaying, on the display, the video event:
receiving, by the digital assistant operating on the electronic device, a second natural language speech input that includes a request to analyze an occurrence of the video event, wherein the occurrence corresponds to a second participant of the video event;

in accordance with receiving the second natural language speech input, identifying, by the digital assistant, based on the context information associated with the video event, a first location of the second participant; and in accordance with identifying the first location of the second participant, augmenting, by the digital assistant, the display of the video event with a second graphical overlay displayed at a second display location corresponding to the first location of the second participant, wherein the second graphical overlay indicates a trajectory of the second participant, the trajectory corresponding to the occurrence.

30. The electronic device of claim 29, wherein the one or more programs further include instructions for:

in accordance with a determination that the second natural language speech input includes the request to analyze the occurrence of the video event, displaying, on the display, a replay of the occurrence, wherein:
the first location of the second participant is a location in the replay of the occurrence; and
the second display location corresponds to the replay of the occurrence.

31. The electronic device of claim 20, wherein the context information includes at least one of:
second information corresponding to opposing parties of the video event;
a second audio stream of the video event; and
a second annotated event stream of the video event.

32. A method, comprising:
at an electronic device having one or more processors, memory, and a display:
while displaying, on the display, a video event:
receiving, by a digital assistant operating on the electronic device, a first natural language speech input corresponding to a first participant of the video event;
detecting a user gesture input;
in accordance with receiving the first natural language speech input, identifying, by the digital assistant, based on context information associated with the video event, a first location of the first participant, including:

in accordance with a determination that the first natural language speech input refers to the first participant in the present tense, identifying the first location of the first participant as a location corresponding to the user gesture input when a portion of the first natural language speech input is received; and in accordance with identifying the first location of the first participant, augmenting, by the digital assistant, the display of the video event with a first graphical overlay displayed at a first display location corresponding to the first location of the first participant.

33. The method of claim 32, further comprising:
detecting a change from the first location of the first participant to a second location of the first participant; and
in response to detecting the change, displaying, on the display, the first graphical overlay at a second display location corresponding to the second location of the first participant.

34. The method of claim 32, wherein:
the video event is displayed via video pass-through depicting a second display of an external electronic device; and
the display and the second display concurrently display the video event.

35. The method of claim 32, wherein:
the first natural language speech input includes a request to identify the first participant; and
the first graphical overlay includes information corresponding to the first participant.

36. The method of claim 35, wherein identifying the first location of the first participant includes analyzing the display of the video event at the first location of the first participant using the context information associated with the video event to identify the first participant.

37. The method of claim 35, further comprising:
detecting user gaze data, wherein the context information includes the detected user gaze data, and wherein identifying the first location of the first participant includes:
determining, based on the user gaze data, that a user gaze is directed to the first location of the first participant; and
analyzing the display of the video event at the first location of the first participant using the context information associated with the video event to identify the first participant.

38. The method of claim 35, further comprising:
determining that the first natural language speech input refers to the first participant in the past tense; and
in accordance with a determination that the first natural language speech input refers to the first participant in the past tense:
determining, based on previous user gaze data detected before a start time of the first natural language speech input, that a previous user gaze was directed to a previously displayed location;
analyzing the display of the video event at the previously displayed location using the context information associated with the video event to identify the first participant, wherein:
the first location of the first participant is identified as a currently displayed location of the first participant; and identifying the currently displayed location of the first participant is performed in accordance with identifying the first participant.

39. The method of claim 32, further comprising:
while displaying, on the display, the video event:
receiving, by the digital assistant operating on the electronic device, a second natural language speech input corresponding to a second participant of the video event, wherein the second natural language speech input specifies the second participant and includes a request to locate the second participant;
in accordance with receiving the second natural language speech input, identifying, by the digital assistant, based on the context information associated with the video event, a first location of the second participant; and
in accordance with identifying the first location of the second participant, augmenting, by the digital assistant, the display of the video event with a second graphical overlay displayed at a second display location corresponding to the first location of the second participant, wherein the second graphical overlay indicates the first location of the second participant.

40. The method of claim 32, further comprising:
while displaying, on the display, the video event:
receiving, by the digital assistant operating on the electronic device, a second natural language speech input that includes a request to visually distinguish between a first party of the video event and an opposing second party of the video event; and
in accordance with receiving the second natural language speech input and a determination that the second natural language speech input includes the request to visually distinguish between the first party and the opposing second party:
identifying, by the digital assistant, based on the context information associated with the video event:
a first location of a second participant of the video event, wherein the second participant corresponds to the first party; and
a first location of a third participant of the video event, the third participant corresponding to the opposing second party;
in accordance with identifying the first location of the second participant, augmenting, by the digital assistant, the display of the video event with a second graphical overlay displayed at a second display location corresponding to the first location of the second participant; and
in accordance with identifying the first location of the third participant, augmenting, by the digital assistant, the display of the video event with a third graphical overlay displayed at a third display location corresponding to the first location of the third participant.

41. The method of claim 32, further comprising:
while displaying, on the display, the video event:
receiving, by the digital assistant operating on the electronic device, a second natural language speech input that includes a request to analyze an occurrence of the video event, wherein the occurrence corresponds to a second participant of the video event;
in accordance with receiving the second natural language speech input, identifying, by the digital assistant, based on the context information associated with the video event, a first location of the second participant; and
in accordance with identifying the first location of the second participant, augmenting, by the digital assistant, the display of the video event with a second graphical overlay displayed at a second display location corresponding to the first location of the second participant, wherein the second graphical overlay indicates a trajectory of the second participant, the trajectory corresponding to the occurrence.

42. The method of claim 41, further comprising:
in accordance with a determination that the second natural language speech input includes the request to analyze the occurrence of the video event, displaying, on the display, a replay of the occurrence, wherein:
the first location of the second participant is a location in the replay of the occurrence; and
the second display location corresponds to the replay of the occurrence.

43. The method of claim 32, wherein the context information includes at least one of:
second information corresponding to opposing parties of the video event;
a second audio stream of the video event; and
a second annotated event stream of the video event.

* * * * *

UNITED STATES PATENT AND TRADEMARK OFFICE
CERTIFICATE OF CORRECTION

| | | |
|---|---|---|
| PATENT NO. | : 12,407,894 B2 | Page 1 of 1 |
| APPLICATION NO. | : 18/587689 | |
| DATED | : September 2, 2025 | |
| INVENTOR(S) | : Gavin K. Duffy et al. | |

It is certified that error appears in the above-identified patent and that said Letters Patent is hereby corrected as shown below:

In the Claims

In Column 25, Line 24, Claim 12, delete "that the natural language speech input" and insert -- that --.

In Column 26, Line 55, Claim 17, delete "third second" and insert -- third --.

Signed and Sealed this
Fourteenth Day of October, 2025

John A. Squires
*Director of the United States Patent and Trademark Office*